(12) United States Patent
Goda

(10) Patent No.: US 10,677,721 B2
(45) Date of Patent: Jun. 9, 2020

(54) OPTICAL CONCENTRATION MEASURING DEVICE AND CONTROL METHOD FOR OPTICAL CONCENTRATION MEASURING DEVICE

(71) Applicant: Asahi Kasei Microdevices Corporation, Tokyo (JP)

(72) Inventor: Yuji Goda, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 0 days.

(21) Appl. No.: 16/221,584

(22) Filed: Dec. 17, 2018

(65) Prior Publication Data

US 2019/0195785 A1  Jun. 27, 2019

(30) Foreign Application Priority Data

Dec. 22, 2017  (JP) ................. 2017-246699

(51) Int. Cl.
| | | |
|---|---|---|
| *G01J 3/00* | (2006.01) | |
| *G01N 21/3504* | (2014.01) | |
| *G01N 21/25* | (2006.01) | |

(52) U.S. Cl.
CPC ....... *G01N 21/3504* (2013.01); *G01N 21/255* (2013.01)

(58) Field of Classification Search
CPC .. G01N 21/314; G01N 21/33; G01N 21/3504; G01J 3/10; G01J 3/42
USPC .......................................................... 356/51
See application file for complete search history.

(56) References Cited

U.S. PATENT DOCUMENTS

| | | |
|---|---|---|
| 6,982,689 B2 | 1/2006 | Hoshi et al. |
| 7,805,256 B2 | 9/2010 | Frodl |
| 2009/0274176 A1 | 11/2009 | O'Shaughnessy et al. |
| 2014/0160786 A1 | 6/2014 | Hargis et al. |

FOREIGN PATENT DOCUMENTS

| | | |
|---|---|---|
| JP | S61219840 | 9/1986 |
| JP | H0666723 | 3/1994 |
| JP | H08167188 | 6/1996 |
| JP | 2002237650 | 8/2002 |
| JP | 2005063999 | 3/2005 |
| JP | 2014173896 | 9/2014 |
| JP | 2017049190 | 3/2017 |

*Primary Examiner* — Md M Rahman
(74) *Attorney, Agent, or Firm* — JCIPRNET

(57) ABSTRACT

An optical concentration measuring device capable of power saving and lifespan extension of a light source is provided, including a light source emitting an amount of light corresponding to a supplied power; a light detection part receiving at least a part of the light emitted by the light source and generating a signal corresponding an amount of received light as an output signal; a smoothing filter smoothing a signal based on the output signal; a signal change amount calculation part calculating a first and a second change amounts corresponding to a change amount between at least two selected acquisition values selected from acquisition values based on the output signal at current or past time; a light source control part controlling the power supplied to the light source based on the first change amount; and a filter control part controlling characteristics of the smoothing filter based on the second change amount.

20 Claims, 18 Drawing Sheets

103

OPTICAL CONCENTRATION MEASURING DEVICE AND CONTROL METHOD FOR OPTICAL CONCENTRATION MEASURING DEVICE

CROSS-REFERENCE TO RELATED APPLICATION

This application claims the priority of Japan patent application serial no. 2017-246699, filed on Dec. 22, 2017. The entirety of the above-mentioned patent application is hereby incorporated by reference herein and made a part of this specification.

BACKGROUND

Technical Field

The disclosure relates to an optical concentration measuring device and a control method for the optical concentration measuring device.

Related Art

In the related art, an optical concentration measuring device that measures an amount, a density, or a concentration of measurement target molecules in a medium using absorption, diffraction, scattering, or the like of light such as infrared rays, ultraviolet rays, and X-rays is known. For example, embodiment 1 of Patent Document 1 (Japanese Patent Application Laid-Open No. 2014-173896) discloses a gas measuring device using an infrared light source having a heating body that radiates infrared rays as a light source.

The gas measuring device disclosed in Embodiment 1 of Patent Document 1 includes a light source; a first light reception element; a second light reception element; a first optical filter provided between the light source and the first light reception element; and a second optical filter provided between the light source and the second light reception element. Further, the gas measuring device includes a driving circuit that supplies a driving voltage with a predetermined pulse width to the light source; and a control part that controls the driving circuit. The gas measuring device further includes a signal processing unit that calculates a concentration of the gas that is a measurement target based on a first output signal of the first light reception element and a second output signal of the second light reception element.

In embodiment 1 of Patent Document 1, a setting part that sets a resistance value of the light source is connected to the control part. The control part is configured to determine a predetermined pulse width so that a power supplied from the driving circuit to the light source has a defined value, based on the resistance value set by the setting part. The driving circuit is configured to supply a driving voltage having the predetermined pulse width determined by the control part to the light source. Accordingly, in this gas measuring device, also when the resistance value of the light source varies due to, for example, manufacturing variation in the light source, a measured value of the resistance of the light source measured in advance is set as the resistance value by the setting part at the time of manufacturing. Therefore, it is possible to suppress a variation in the power supplied to the light source. Thus, it is possible to improve precision of measurement.

Further, for example, Patent Document 2 (Japanese Patent Application Laid-Open No. 2017-49190) discloses an ozone measuring device using a light emitting diode (UVLED) that emits light in an ultraviolet region as a light source. The ozone measuring device disclosed in Patent Document 2 includes a light emitting diode that emits light in an ultraviolet region; a driving circuit that turns on the light emitting diode in pulses; a measurement part that is irradiated with the light from the light emitting diode; a photoelectric conversion part that receives light emitted from the measurement part due to irradiation of the light from the light emitting diode, converts the received light into a voltage according to the amount of received light, and generates the voltage; a Gaussian filter circuit that shapes a waveform of the voltage signal generated by the photoelectric conversion part into a substantially Gaussian waveform and generates a resultant voltage signal; a sample and hold circuit that holds and generates a voltage signal corresponding to a voltage signal in a certain period of time including a peak at an output generated by the Gaussian filter circuit; and an analog-to-digital conversion circuit that performs an analog-to-digital conversion on a voltage signal generated by the sample and hold circuit. This ozone measuring device can shorten a total turn-on time of the UVLED in continuous measurement by turning on the UVLED in a pulsed manner to extend a lifespan of the UVLED as a period of time in which the UVLED can be continuously used in the continuous measurement.

In an optical concentration measuring device that measures a concentration of a measurement target such as a gas, power saving and lifespan extension of a light source may be expected.

SUMMARY

In an aspect of the disclosure, an optical concentration measuring device is provided to include a light source that emits an amount of light corresponding to a power to be supplied; a light detection part that receives at least a part of the light emitted by the light source and generates a first signal corresponding to an amount of received light as an output signal; a smoothing filter that smooths a second signal based on the output signal; a signal change amount calculation part that calculates a first change amount and a second change amount corresponding to a change amount between at least two selected acquisition values selected from acquisition values based on the output signal at a current or past time; a light source control part that controls the power supplied to the light source based on the first change amount; and a filter control part that controls characteristics of the smoothing filter based on the second change amount. With the optical concentration measuring device according to the embodiment using the disclosure, it is possible to improve power saving performance of the light source and extend a lifespan of the light source while suppressing degradation of the measurement precision and degradation of the responsiveness.

In an aspect of the disclosure, a control method for an optical concentration measuring device is provided to include emitting, by a light source, an amount of light corresponding to a power to be supplied; receiving, by a light detection part, at least a part of the light emitted by the light source and generating a signal corresponding to an amount of received light as an output signal; smoothing, by a smoothing filter, a signal based on the output signal; calculating, by a signal change amount calculation part, a first change amount and a second change amount corresponding to a change amount between at least two selected acquisition values selected from acquisition values based on the output signal at a current or past time; controlling, by a light source control part, the power supplied to the light source based on the first change amount; and controlling, by a filter control part, characteristics of the smoothing filter based on the second change amount.

It should be noted that the above summary does not list all necessary characteristics of the disclosure. In addition, subcombinations of a group of the characteristics can also be part of the disclosure.

DESCRIPTION OF THE EMBODIMENTS

Figure 1:
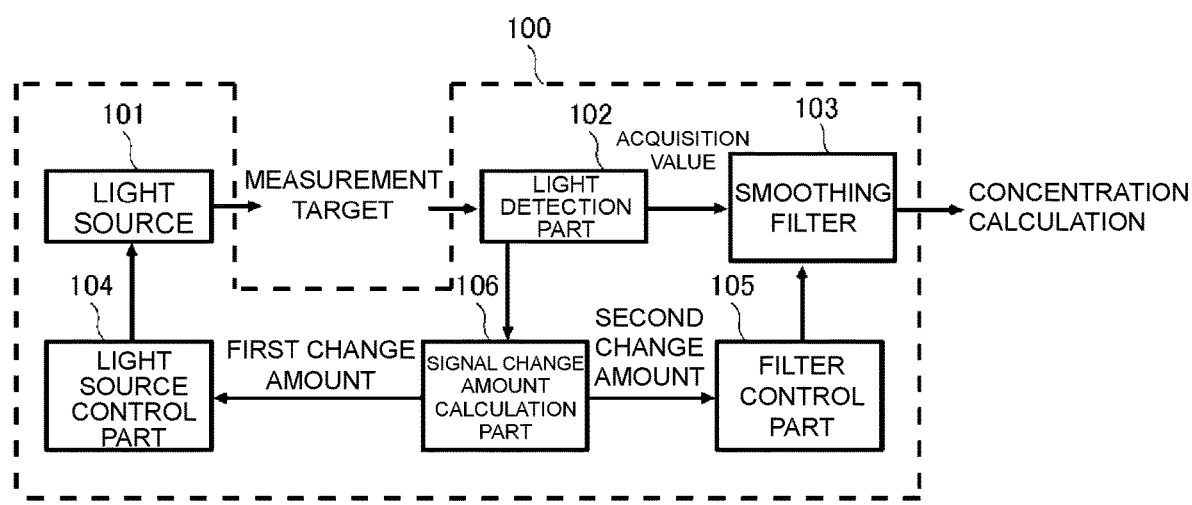
FIG. 1 is a diagram illustrating a configuration example of an optical concentration measuring device according to an embodiment of the disclosure.

Hereinafter, the disclosure will be described through embodiments of the present disclosure, but the following embodiments do not pose any limitation according to claims. In addition, not all of combinations of characteristics described in the embodiments are necessarily essential to solution means provided in the disclosure.

In the specification, the number, a density, and a concentration of measurement target molecules of an optical concentration measuring device may be simply referred to as a concentration of measurement target molecules.

In an optical concentration measuring device using a method of measuring the an number, a density, and a concentration of measurement target molecules in a medium using absorption, diffraction, scattering, and the like of light such as infrared rays, ultraviolet rays, or X-rays emitted from a light source, like the gas concentration measuring device disclosed in Patent Document 1 and the ozone measuring device disclosed in Patent Document 2, pulsed driving of the light source is often used. This is effective from the viewpoint of extension of a lifespan of the light source and also is effective from the viewpoint of improvement of power saving performance of the light source, as mentioned in Patent Document 2.

Here, for example, a pulse width of single pulse driving may be shortened for further extension of the lifespan of the light source or further improvement of the power saving performance of the light source. Further, a frequency of pulse driving may be lowered. However, when the pulse width of single pulse driving is shortened, a total amount of light, that is, a signal reaching a photodetector that receives measurement light corresponding to the first light reception element and the second light reception element in Embodiment 1 of Patent Document 1 or the photoelectric conversion part in Patent Document 2 decreases. As a result, a proportion accounted for by noise relatively increases and a signal-to-noise ratio (SNR) decreases, thereby degrading measurement precision. On the other hand, when the frequency of the pulse driving is lowered, an SNR of a signal obtained from single pulse driving does not change so that the measurement precision with respect to single pulse driving is maintained, but responsiveness decreases with respect to a temporal change in the number, the density, and the concentration of the measurement target molecules as a frequency at which the photodetector receiving the measurement light receives the measurement light decreases. Here, shortening of the pulse width of single pulse driving and lowering of the frequency of pulse driving both reduce the power supplied to the light source. That is, the decrease in SNR and the degradation of the responsiveness described above are essentially caused by the reduction in the power supplied to the light source.

That is, in the optical concentration measuring device, essentially, there is a trade-off relationship between extension of the lifespan of the light source or improvement of power saving performance of the light source, improvement of the measurement precision, and improvement of the responsiveness. The optical concentration measuring device according to at least some aspects in the specification makes it possible to improve the power saving performance of the light source and extend the lifespan of the light source while suppressing degradation of the measurement precision and degradation of the responsiveness.

FIG. 1 is a diagram illustrating a configuration example of an optical concentration measuring device 100 according to an embodiment of the disclosure. The optical concentration measuring device 100 includes a light source 101, a light detection part 102, a light source control part 104, a signal change amount calculation part 106, a smoothing filter 103, and a filter control part 105.

The light source 101 irradiates light toward a measurement target such as a gas. The light detection part 102 receives at least a portion of the light emitted from the light source 101 via the measurement target and generates a signal corresponding to an amount of received light as an output signal. The light received by the light detection part 102 may include light obtained by light irradiated from the light source 101 passing through the measurement target, or may include light that is reflected or scattered in the measurement target. In the measurement target, a wavelength component of light corresponding to the measurement target molecules is attenuated according to a concentration of the measurement target molecules. Therefore, the concentration of the measurement target molecules can be calculated from an intensity of a predetermined wavelength component of the light detected by the light detection part 102. The concentration calculation may be performed inside the optical concentration measuring device 100 or may be performed outside the optical concentration measuring device 100.

In the smoothing filter 103, an acquisition value detected by the light detection part 102 is smoothed and then generated as a smoothed signal. The acquisition value is a value having a correlation with a value of an output signal corresponding to an intensity of the light detected by the light detection part 102. The acquisition value may be the value of the output signal itself, may be a value of a signal obtained by smoothing the output signal, may be a value obtained by performing a predetermined process or calculation on the value of the output signal.

The light source control part 104 controls the power supplied to the light source 101 based on a change amount between at least two selected acquisition values that are selected from acquisition values at the current or past time. In this example, the signal change amount calculation part 106 calculates a first change amount between two selected acquisition values, and inputs the first change amount to the light source control part 104. The light source control part 104 can reduce the power consumption in the light source 101 by controlling the power supplied to the light source 101 based on the first change amount. Accordingly, it is possible to realize power saving in the light source 101 and extend a lifespan thereof. A control method in the light source control part 104 will be described below. In addition, the light source control part is not always required to control the light source 101 based on the first change amount and may control the light source 101 based on the first change amount only for an arbitrary period of time.

The filter control part 105 controls characteristics of the smoothing filter 103 based on the change amount between the at least two selected acquisition values that are selected from acquisition values at the current or past time. In this example, the signal change amount calculation part 106 calculates a second change amount between the two selected acquisition values, and inputs the second change amount to the filter control part 105. The first change amount and the second change amount may be the same or different values. The selected acquisition values corresponding to the first change amount and the selected acquisition values corresponding to the second change amount may be the same selected acquisition values or may be different selected acquisition values. The filter control part 105 controls the filter characteristics of the smoothing filter 103 based on the second change amount. Accordingly, it is possible to improve power saving performance of the light source 101 and extend a lifespan of the light source 101 while suppressing a decrease in SNR and a degradation of responsiveness. A control method in the filter control part 105 will be described below. In addition, the filter control part is not always required to control the smoothing filter 103 based on the second change amount and may control the smoothing filter 103 based on the second change amount only for an arbitrary period of time.

(Light Source)

Types, structures, and the like of the light source 101 are not particularly limited as long as the light source 101 can emit light including a wavelength band in which the light detection part 102 has sensitivity, and at which the measurement target molecules exert actions such as absorption, diffraction, or scattering.

For example, when infrared rays are used for measurement, a thermal type element such as an incandescent light bulb, a ceramic heater, or a micro-electro-mechanical systems (MEMS) heater, a quantum type element such as an infrared light emitting diode (LED), or the like can be used as the light source 101. Further, for example, when ultraviolet rays are used for measurement, the quantum type element such as an ultraviolet LED, a mercury lamp, or the like can be used. Further, for example, when X-rays are used for measurement, an electron beam, an electronic laser, or the like can be used.

More specifically, for example, when the measurement target is a concentration of carbon dioxide in a measurement target space, the carbon dioxide absorbs, for example, light having a wavelength of about 4.3 $\mu$m well, that is, exhibits a good sensitivity to the light. Accordingly, the thermal type element or the infrared LED described above can be used. At this time, if the thermal type element as described above is used as the light source, a light emitting portion may be about 400 K (Kelvin) to about 2400 K. From calculation of a spectrum of blackbody radiation based on Planck's law, it can be understood that light with these temperatures contains a lot of light having this wavelength. Similarly, since methane absorbs, for example, light having a wavelength of about 3.3 $\mu$m well and ethanol absorbs, for example, light having a wavelength of about 3.4 $\mu$m or about 9.4 $\mu$m well, a light source having a light emission temperature for these wavelengths can be used. Further, when the quantum type element such as an LED is used as the light source, an element corresponding to a wavelength at which the measurement target molecules exhibit sensitivity may be used. For example, an infrared LED that emits light having a wavelength of about 3.3 $\mu$m to about 9.4 $\mu$m described above can be realized, for example, by using a compound semiconductor such as InSb. For example, Asahi Kasei Microdevices Corporation sells an infrared LED (AK9700AE) that can be used for measurement of a carbon dioxide concentration through observation of absorption of infrared rays.

Further, a wavelength of light at which the measurement target molecules exhibit sensitivity may be directly obtained through spectral analysis of a substance including the measurement target molecules, or may be obtained by referring to, for example, NIST Chemistry Web Book (http://webbook.nist.gov/chemistry/).

Generally, a light source converts electrical energy into light energy and emits the light energy regardless of types of the light source. Therefore, if it is in a range that the light source 101 operates normally, the intensity of the light emitted by the light source 101 increases as the power supplied to the light source 101 increases. In other words, as the power supplied to the light source 101 increases, the amount of light that is emitted per unit time by the light source 101 increases.

More specifically, for example, when the thermal type element is used as the light source 101, as the supplied power becomes larger, the temperature of a heat generation portion becomes higher and the amount of radiation of heat from the heat generation portion increases, so that the intensity of the light emitted by the light source 101 becomes stronger.

Further, for example, when the quantum type element is used as the light source 101, the number of carriers injected per unit time increases and radiative recombination increases as a driving current increases, so that the intensity of the light emitted by the light source 101 becomes stronger. In other words, as the driving current supplied to the light source 101 increases, the amount of light that is emitted per unit time by the light source 101 becomes larger. On the other hand, since the quantum type element has an electrical resistance component, the supplied power becomes larger as the driving current increases.

Therefore, there is a trade-off relationship between the intensity of the light that is emitted by the light source 101 or the amount of light that is emitted per unit time and the amount of power consumption or average power consumption of the light source 101 (that is, power saving performance). For example, as a light emission time per unit time becomes shorter, the amount of power consumption or average power consumption of the light source 101 becomes smaller, but the amount of light that is emitted per unit time by the light source 101 also becomes smaller. Further, for example, as more power is supplied to the light source 101 when the light source 101 is caused to emit light, the intensity of the light emitted by the light source 101 becomes stronger and the amount of light emitted per unit time becomes larger, but the amount of power consumption or average power consumption of the light source 101 also becomes larger.

Further, generally, the lifespan of the light source is exhausted with the accumulated use time and eventually the function of the light source is lost regardless of types of the light source. For example, when a thermal type element is used as the light source 101, deterioration progresses due to the heat generation portion being brought into a high temperature state at the time of light emission with the accumulated use time, and eventually the light source 101 loses its function. In particular, for example, when an incandescent light bulb is used as the light source 101, a filament deteriorates together with an accumulated light emission time and is eventually broken. Further, because a resistance of the light source 101 is changed due to the deterioration of the filament, according to methods of driving the light source 101, optical characteristics and electrical characteristics of the incandescent light bulb are changed due to the deterioration of the filament, so that the lifespan of the light source 101 of the optical concentration measuring device 100 may be reached before breakage of the filament.

Further, the deterioration of the filament involves chemical change and dissipation of a filament material. Accordingly, contamination of an inner wall of a bulb constituting the incandescent light bulb progresses and the amount of light being radiated changes, so that the lifespan of the light source 101 of the optical concentration measuring device 100 may be reached before breakage of the filament.

Further, for example, when the quantum type element is used as the light source 101, a density of defects present in a semiconductor may increase or diffusion of impurities may progress due to, for example, energy generated in a non-radiative recombination process of injected carriers, together with the accumulated use time, performance of the light source 101 degrades and eventually a function thereof is lost.

Further, also when the quantum type element is used, optical characteristics and electrical characteristics of the light source 101 are changed together with the accumulated use time, so that the lifespan of the light source 101 of the optical concentration measuring device 100 may be reached, similar to the case of the incandescent light bulb before the light source stops functioning completely.

Further, for example, when a mercury lamp is used as the light source 101, the lifespan may be limited due to deterioration of electrodes of the mercury lamp, similar to the filament of the incandescent light bulb. Further, deterioration of the electrode involves chemical change and dissipation of an electrode material, similar to the filament of the incandescent light bulb. Accordingly, contamination of an inner wall of a bulb constituting the mercury lamp progresses and the amount of light which is radiated changes, so that the lifespan of the light source 101 of the optical concentration measuring device 100 may be reached without complete loss of a light emitting function being needed.

On the other hand, deterioration and exhaustion of the lifespan of the light source 101 progress faster as the power supplied to the light source 101 becomes greater. Heat is generated in the light source itself as long as power is supplied regardless of types of the light source 101, and the temperature of the light source 101 rises. The deterioration and the exhaustion of the lifespan described above are accelerated due to this temperature rise, and accordingly the deterioration and the exhaustion of the lifespan of the light source 101 proceed faster as the supplied power becomes larger. Further, when the light source 101 is pulse driven as will be described below, a temperature change range of the light source 101 at the time of driving and the time of pausing increases as the supplied power becomes greater at the time of driving, and a physical stress caused by the thermal expansion and contraction due to the temperature change also increases. Accordingly, the deterioration and the exhaustion of the lifespan of the light source 101 progress faster as the supplied power becomes larger.

Therefore, there is a trade-off relationship between the intensity of the light emitted by the light source 101 and the amount of light emitted per unit time, and the lifespan of the light source 101. For example, the shorter the light emission time per unit time, the longer the lifespan of the light source 101 is, but the amount of light that the light source 101 emits per unit time decreases. Further, for example, as larger power is supplied to the light source 101 when the light source 101 is caused to emit light, the intensity of the light emitted by the light source 101 is stronger and the amount of light emitted per unit time becomes larger, but the lifespan of the light source 101 is shortened.

(Light Detection Part)

Types, structures, and the like of the light detection part 102 are not particularly limited as long as the light detection part 102 can receive at least a part of the light that is emitted by the light source 101 and generate a signal corresponding to an amount of received light as an output signal. For example, a photoelectric conversion element corresponding to light to be used for measurement may be used as the light detection part 102. More specifically, for example, when infrared rays are used for measurement, a thermal type infrared sensor such as a pyroelectric sensor, a thermopile, or a bolometer, and a quantum type infrared sensor such as a photodiode or a phototransistor may be used. Further, for example, when ultraviolet rays are used for measurement, a quantum type ultraviolet sensor such as a photodiode or a phototransistor may be used. Further, for example, when X-rays are used for measurement, various semiconductor sensors or the like may be used.

In addition, the light detection part 102 may include an optical filter and, particularly, a band pass filter (hereinafter simply referred to as an optical filter) in order to selectively receive light having a specific wavelength. The change amount, i.e., the sensitivity of the output signal of the light detection part 102 with respect to the concentration of the measurement target molecules can be increased by selectively transmitting light having a wavelength at which the measurement target molecules exhibit a sensitivity using the optical filter. Alternatively, it is possible to suppress an influence of sensitivity or disturbance of non-measurement target molecules to light having a wavelength at which the measurement target molecules do not exhibit sensitivity, on the output signal of the light detection part 102, by selectively blocking light having a wavelength at which the measurement target molecules do not exhibit sensitivity using the optical filter.

Such an optical filter may be realized, for example, by forming a thin film on a base (a Si or Ge, quartz or sapphire substrate) having high transmittance using CVD, sputtering, vapor deposition, or the like and controlling a transmission wavelength of light using an action of an interference film. For example, Asahi Kasei Microdevices Corporation sells an infrared sensor (AK9710AE) in which an optical filter that can be used to measure a carbon dioxide concentration by observing absorption of infrared rays has been mounted.

Further, the light detection part 102 may include a circuit that processes an electrical signal came from the photoelectric conversion element described above. More specifically, for example, the light detection part 102 may include an amplifier circuit that amplifies an output of the photoelectric conversion element described above, and generates an amplified output as an output signal. Further, for example, the light detection part 102 may include an analog-to-digital conversion circuit that performs analog-to-digital conversion on the output generated by the photoelectric conversion element described above or the amplified output described above, and generates a converted digital value as an output signal.

The light detection part 102 may integrate the output generated by the photoelectric conversion element described above or the amplified output described above for a certain time according to a light emission state of the light source 101 or the like, and generate a result of the integration as an output signal. Further, the same integration may be performed simultaneously with analog-to-digital conversion.

(Smoothing Filter)

Type, structures, and the like of the smoothing filter 103 are not particularly limited as long as the smoothing filter 103 can be applied to the output signal of the light detection part 102, a value in a process of calculating the concentration from the output signal, or a concentration value calculated based on the output signal, and these signals are used as an input signal of the smoothing filter 103, such that a signal obtained by smoothing these signals in a time domain (referred also to as a smoothed signal in this specification) can be generated, that is, an influence of noise such as representative thermal noise to be described below can be suppressed and filter characteristics thereof can be controlled by the filter control part 105 to be described below.

Since the smoothing filter 103 is intended to suppress the influence of noise and generate a signal obtained by improving the SNR of the input signal as described above, a low pass filter may be used. In addition, when it is predicted that some kind of noise will be superimposed at a lower frequency than that of the originally expected input signal, a band pass filter capable of blocking frequency components of such noise may be used.

When an analog filter is used as the smoothing filter 103, for example, the smoothing filter may be formed and used by combining passive elements or by using an active element such as an operational amplifier. Further, filter characteristics controlled by the filter control part 105 is also possible by using variable resistors, variable capacitors, or the like. Alternatively, a configuration in which a plurality of smoothing filters is prepared and the smoothing filter to be used is selected by the filter control part 105 may be adopted, such that the filter control part 105 can control the filter characteristics of the smoothing filter 103.

Further, for example, the filter characteristics of the filter may be controlled by controlling a time constant of the analog filter. That is, since a wider range of frequency components are blocked as the time constant is increased, the SNR of the smoothed signal can be made higher. Further, on the other hand, since a wider range of frequency components pass through as the time constant is decreased, the response of the smoothed signal to the input signal can be made faster.

Figure 2:
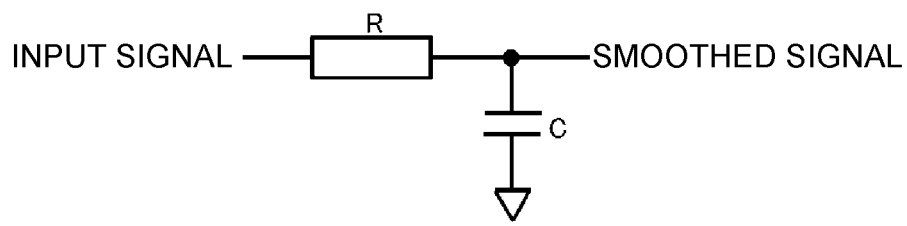
FIG. 2 is a diagram illustrating an example of a smoothing filter.

FIG. 2 is a diagram illustrating an example of the smoothing filter 103. For the smoothing filter 103, for example, an RC low-pass filter including a resistor and a capacitor as illustrated in FIG. 2 can be used. When a resistance value is expressed as R [Ω] and a capacitance value is expressed as C [F], a time constant τ and a cutoff frequency fc of this RC low-pass filter can be expressed by the following equation (1).

$$\tau = RC [s], \; fc = \frac{1}{2\pi RC} [\text{Hz}] \tag{1}$$

Here, for example, a variable resistor may be used as the resistor, and filter characteristics may be controlled by controlling a resistance value of the variable resistor. A field effect transistor (FET), for example, can be used as the variable resistor. Since a resistance value between the drain and the source can be substantially changed by controlling a voltage applied between a gate and a source of the FET, the FET can be used as a variable resistor.

When a digital filter is used as the smoothing filter 103, for example, an infinite impulse response filter (IIR filter) or a finite impulse response filter (FIR filter) may be used. In this case, it is possible for the filter control part 105 to control the filter characteristics of the filter by controlling various coefficients of the filter.

For example, a first-order low-pass filter may be used as the IIR filter. More specifically, for example, when an ith input signal is expressed as $x_i$ and the smoothed signal is expressed as $y_i$, a digital filter expressed by the following equation (2) using a coefficient α (α is a real number greater than 0 and smaller than or equal to 1) may be used.

$$y_i = y_{i-1} + \alpha \cdot (x_i - y_{i-1}) \tag{2}$$

Here, the filter characteristics of the filter may be controlled by controlling the coefficient α. That is, since an influence of a new input signal decreases as α decreases, the SNR of the smoothed signal can be made higher. On the other hand, since the influence of the new input signal increases as α increases, a response of the smoothed signal to the input signal can be made faster.

For example, a moving average filter may be used as the FIR filter. More specifically, for example, when an ith input signal is expressed as $x_i$ and the smoothed signal is expressed as $y_i$, a digital filter (a moving average filter) expressed by the following equation (3) using the coefficient α and a number n of points to be used for the moving average may be used.

$$y_i = \frac{1}{n} \cdot \sum_{k=0}^{n-1} x_{i-k} \quad (3)$$

Here, the filter characteristics of the filter may be controlled by controlling the number n of points to be averaged. That is, since a noise component decreases due to averaging as n increases, the SNR of the smoothed signal can be made higher. On the other hand, since an influence of the old input signal becomes smaller as the value of n decreases, a response of the smoothed signal to the input signal can be made faster.

Further, an average value weighted using a coefficient αk may be used as the output of the filter. In this case, different values for different k may be used as the coefficient αk. Further, in this case, a value of a divisor n may be adjusted with respect to a sum of the coefficients αk. For example, the following equation (4) may be used instead of Equation 3.

$$y_i = \sum_{k=0}^{n-1} (\alpha_k \cdot x_{i-k}) \Big/ \sum_{k=0}^{n-1} (\alpha_k) \quad (4)$$

Here, the filter characteristics of the filter may be controlled by controlling αk. That is, when n is constant and αk is constant irrespective of the value of k, a noise component decreases due to averaging. Accordingly, the SNR of the smoothed signal can be made higher. Further, on the other hand, for example, since an influence of a new input signal is increased by increasing αk for a smaller k, a response of the smoothed signal to the input signal can be made faster. Further, for example, since the influence of the new input signal is increased by increasing αk only for k=0, the response of the smoothed signal to the input signal can be made faster.

Further, the smoothing filter 103 is not limited to the IIR filter or the FIR filter described above, and a plurality of digital filters may be combined to constitute the smoothing filter 103. Further, an analog filter and a digital filter may be combined to constitute the smoothing filter 103.

Also, when the analog filter is used as the smoothing filter 103 or the digital filter is used as the smoothing filter 103 as described above, it is possible to control a degree of improvement of the SNR of the smoothed signal and a response with respect to the input signal by controlling the filter characteristics. However, in these methods, when a signal obtained by improving the SNR of the input signal is generated, a current state or a latest input signal is eventually used together with a past state or a past input signal instead of the current state or the latest input signal being used as it is regardless of types of the filter, thereby realizing improvement of the SNR. Therefore, the response of the smoothed signal to the input signal becomes slow due to an influence of past information as the degree of improvement of the SNR due to the smoothing filter 103 becomes higher due to control of the filter characteristics. Further, on the other hand, the degree of improvement of the SNR due to the smoothing filter 103 is lowered as the response of the smoothed signal to the input signal becomes faster.

Therefore, there is a trade-off relationship between an SNR of a signal using the improvement of the SNR due to the smoothing filter 103, that is, the smoothed signal and responsiveness of the signal. For example, when the smoothing is strongly performed by the smoothing filter 103, the SNR of the signal generated by the smoothing filter 103 becomes higher, but the responsiveness of the signal is degraded. Further, for example, when the smoothing by the smoothing filter 103 is weakened, the SNR of the signal generated by the smoothing filter 103 is lowered, but the responsiveness of the signal is improved.

(Light Source Control Part)

Type, structures, and the like of the light source control part 104 are not particularly limited as long as the light source control part 104 can control supply of power to the light source 101 based on the first change amount which the signal change amount calculation part inputs. The first change amount is a change amount that is calculated from at least two selected acquisition values selected from acquisition values based on the output signal of the light detection part 102. As an example, the first change amount can be calculated from a difference between two values (the selected acquisition values) at different times of the output signal of the light detection part 102. Further, as another example, the first change amount can be calculated from a ratio between two values (the selected acquisition values) at different times of the output signal of the light detection part 102.

For example, when the light source 101 is driven through constant current driving in controlling the supply of power, a driving current value or a driving time per unit time may be controlled. Further, for example, when the light source 101 is driven through constant voltage driving, an applied voltage value or an application time per unit time may be controlled. Further, for example, when the light source 101 is driven through constant power driving, a supplied power value or a supply time per unit time may be controlled.

Further, the control of the light source 101 may be performed in a pulsed manner. Here, the pulsed control of the light source 101 refers to a control for periodically repeating execution (an ON state) and stopping (an OFF state) of light emission under certain conditions. In this case, control of the pulse width may be performed as the control of the driving time per unit time, the control of the application time, or the control of the supply time described above.

Further, for control of the pulse width, a substantial pulse width may be controlled through control of the number of ON states occurring per unit time without changing one pulse width, to control the supply of power to the light source 101. For example, supply of power to the light source 101 for one second every five seconds, as compared with a case in which power is supplied to the light source 101 for one second every ten seconds, means control to increase a supply time per unit time described above.

Alternatively, control of a current flowing through the light source 101, a voltage applied to the light source 101, or a power supplied to the light source 101 in the ON state of the pulse may be performed as control of the pulse height. Further, a driving condition of the light source 101 may be changed during the ON state of one pulse. Alternatively, both the control of the pulse width and the control of the current flowing through the light source 101, the voltage applied to the light source 101 or the power supplied to the light source 101 in the ON state may be performed. It should be noted that in the OFF state of the pulse driving, the supply of power to the light source 101 may not be completely cut off. In order to perform the above-described control, the light source control part 104 may include a constant current driving circuit, a constant voltage driving circuit, or a constant power driving circuit. In addition, a digital circuit including a microcontroller, an LSI, or the like may be included in order to control a driving timing or the driving conditions.

Further, generally, since it is difficult for the light detection part 102 to receive all of the energy of the light emitted by the light source 101 and/or to generate an output signal which has all of the energy of the received light, the output signal may be weak. As a result, the SNR of the optical concentration measuring device 100 greatly depends on the amount of noise included in the output signal of the light detection part 102. Further, generally, since the noise included in the output signal of the light detection part 102 has a large amount of components derived from thermal noise to be described below, the total amount of noise included in the output signal per unit time greatly depends on a time for which the light detection part 102 has received the light, rather than the intensity of light received by the light detection part 102.

Therefore, when the control of the light source 101 is performed in a pulsed manner, a pulse width may be shortened particularly to reduce the amount of supply of power to the light source 101. When the amount of supply of power to the light source 101 is decreased by decreasing a pulse height, the output signal itself per unit time is reduced but the total amount of noise included in the output signal does not decrease greatly. On the other hand, when the amount of the supply of power to the light source 101 is decreased due to a decrease in the pulse width, the output signal itself per unit time is decreased, but at the same time, the total amount of noise included in the output signal also is decreased. Thus, it is possible to suppress a decrease in SNR due to a decrease in the amount of supply of power to the light source 101, as compared with the case in which the pulse height is decreased.

Further, when the control of the light source 101 is performed in a pulsed manner, the pulse height may be increased particularly when the amount of supply of power to the light source 101 is increased. When the amount of supply of power to the light source 101 is increased due to an increase in the pulse width, the output signal itself per unit time increases, but the total amount of noise included in the output signal also increases at the same time. On the other hand, when the amount of supply of power to the light source 101 is increased due to an increase in the pulse height, the output signal itself per unit time increases, but the total amount of noise included in the output signal does not increase largely. It is possible to promote improvement of the SNR through an increase in the amount of supply of power to the light source 101, as compared with the case in which the pulse width is increased. The SNR will be described below.

(Filter Control Part)

Type, structures, and the like of the filter control part 105 are not particularly limited as long as the filter control part 105 can control the filter characteristics of the smoothing filter 103 based on the inputted second change amount. The second change amount is a change amount of change that is calculated from at least two selected acquisition values selected from acquisition values based on the output signal of the light detection part 102. As an example, the second change amount can be calculated from a difference between two values (the selected acquisition values) at different times of the output signal of the light detection part 102. Further, as another example, the second change amount can be calculated from a ratio between the two values (the selected acquisition values) at different times of the output signal of the light detection part 102. Further, the second change amount may be the same value as the first change amount or may be a different value from the first change amount.

When the above-described analog filter is used as the smoothing filter 103, a time constant thereof may be controlled, for example. Further, when an FET is used as a variable resistor for controlling the filter characteristics as in the description of the smoothing filter 103, the filter control part 105 may include a digital-to-analog converter (DAC), and control a voltage between the gate and the source of the FET using an output of the DAC or an output obtained by buffering the output of the DAC in a buffer circuit.

Further, when a configuration in which a plurality of smoothing filters 103 are prepared and the smoothing filter 103 to be used is selected by the filter control part 105 as in the description of the smoothing filter 103 is adopted, the filter control part 105 may include an analog switch and select a path using this switch to perform control of the filter characteristics.

When the above-described digital filter is used as the smoothing filter 103, the filter control part 105 may control various coefficients of the digital filter, for example, by giving an instruction to a digital circuit constituting the digital filter. This instruction may be transferred from the filter control part 105 to the smoothing filter 103 via a communication bus.

(SNR)

Generally, even when any of the above-described light source and the light detection part are used as the light source 101 and the light detection part 102, the output signal generated from the light detection part 102 includes noise that does not depend on frequencies, in addition to a signal to be ideally generated. This noise is, for example, thermal noise derived from the light source 101 itself or a driving circuit for supplying power to the light source 101, and a photoelectric conversion element of the light detection part 102 or a circuit that processes an electrical signal generated from the photoelectric conversion element. Therefore, this output signal has a finite signal-to-noise ratio (SNR). Here, it is generally known that a distribution of a magnitude of the thermal noise becomes a normal distribution.

Further, since the input signal of the smoothing filter 103 is the output signal of the light detection part 102 or the value based on the output signal as described above, the smoothed signal generated by the smoothing filter 103 has an SNR based on the SNR of the output signal of the light detection part 102. But, the SNR of the smoothed signal is improved as compared with the SNR of the output signal by being smoothed.

In addition, since any of SNRs of the output signal or the smoothed signal, and a value in a process of calculating the concentration from the output signal ultimately influences measurement precision of the concentration of the measurement target molecules in the optical concentration measuring device 100, the higher SNR is, the better the measurement precision. Here, since both of the smoothed signal and the value in a process of calculating the concentration from the output signal are values based on the output signal, it is eventually for the SNR of the output signal to be high.

Since the light detection part 102 generates a signal having a magnitude corresponding to the amount of received light as described above, the SNR of the output signal generated by the light detection part 102 depends on the amount of light received by the light detection part 102. That is, the SNR of the output signal becomes higher as the intensity of the light that is emitted by the light source 101 or the amount of light that is emitted per unit time becomes larger. Therefore, the SNR of the output signal has a positive correlation with the intensity of the light that is emitted by the light source 101 or the amount of light that is emitted per unit time.

For example, when the light detection part 102 generates one output signal, the SNR of the output signal becomes higher as the power to be supplied to the light source 101 is increased when the time for which the light source 101 is emitting light is constant or as the time for which the light source 101 is emitting light is increased when the power supplied to the light source 101 is constant.

More specifically, for example, it is possible to increase the amount of light that the light detection part 102 receives per unit time by increasing the power supplied to the light source 101 and increasing the intensity of the light emitted by the light source 101 as described above. Accordingly, the SNR of the output signal can be made higher through an increase in the signal generated by the light detection part 102. Further, for example, the SNR of the output signal can be made higher through an increase in the time for which the light source 101 is emitting light and time-integrating the signal generated by the light detection part 102 over a longer period of time. However, when the SNR of the output signal is increased due to an increase in the power supplied to the light source 101, the increase in a time for which the light source 101 is emitting light, or a combination thereof, the amount of power consumption or average power consumption of the light source 101 also increases.

Since there is a trade-off relationship between the intensity of the light that is emitted by the light source 101 or the amount of light that is emitted per unit time and the amount of power consumption or the average power consumption of the light source 101 (that is, power saving performance) as described above, there is a trade-off relationship between the SNR of the output signal generated by the light detection part 102 having a positive correlation with the intensity of the light that is emitted by the light source 101 or the amount of light that is emitted per unit time and the amount of power consumption or the average power consumption of the light source 101 (that is, power saving performance).

For example, there is a trade-off relationship between the magnitude of the output signal generated by the light detection part 102 and the amount of power consumption or the average power consumption of the light source 101 (that is, power saving performance). For example, as the light emission time per unit time becomes shorter, the amount of power consumption or average power consumption of the light source 101 becomes smaller, but the SNR of the output signal generated by the light detection part 102 becomes smaller. Further, for example, as higher power is supplied to the light source 101 when the light source 101 is caused to emit light, the SNR of the output signal generated by the light detection part 102 increases, but the amount of power consumption or average power consumption of the light source 101 also increases.

Further, there is the trade-off relationship between the intensity of the light emitted by the light source 101 or the amount of light emitted per unit time, and the lifespan of the light source 101, as described above. Further, the output signal generated by the light detection part 102 has a positive correlation with the intensity of the light that is emitted by the light source 101 or the amount of light that is emitted per unit time. Therefore, there is a trade-off relationship between the SNR of the output signal generated by the light detection part 102 and the lifespan of the light source 101.

When the concentration of measurement target molecules is measured according to the details described above and the optical concentration measuring device 100, as such a signal, the smoothed signal of which the SNR has been improved relative to the output signal can be used instead of directly using the output signal. Therefore, there is a trade-off relation between the measurement precision and the responsiveness of the optical concentration measuring device 100 and the power saving performance of the light source or the lifespan of the light source.

(Signal Change Amount Calculation Part)

Types, structures, and the like of the signal change amount calculation part 106 are not particularly limited as long as the signal change amount calculation part 106 can calculate the first change amount (a signal change amount calculated for light source control) and the second change amount of change (a signal change amount calculated for filter control) from the at least two selected acquisition values selected from the acquisition values based on the output signals of the light detection part 102 at the current time and a past time and generate the first change amount and the second change amount to the light source control part 104 and the filter control part 105. The selected acquisition value used for calculation of the first change amount and the selected acquisition value used for calculation of the second change amount may be the same or may be different.

As the signal change amount calculation part 106, a digital circuit including an analog circuit, a microcontroller, an LSI, or the like can be used. Further, a memory for temporarily storing the acquisition values for use in calculating the first change amount and the second change amount may be included.

The signal change amount calculation part 106 calculates the first change amount and the second change amount indicating how the acquisition value based on the output signal of the light detection part 102 changes from the at least two selected acquisition values described above. More specifically, for example, a value indicating a trend of change in the output signal, such as whether the output signal has a trend of increasing or decreasing or at what rate the output signal is increasing or decreasing when the output signal is increasing or decreasing, that is, a change amount of the acquisition value over time based on the output signal of the light detection part 102 is calculated as the first change amount and the second change amount. Here, since both the first change amount and the second change amount are essentially values based on the temporal change amount of the acquisition value based on the output signal, an increase and decrease in the first change amount and an increase and decrease in the second change amount may have a positive correlation. That is, signal change amount calculation part 106 may be configured so that when one of the first change amount and the second change amount increases, the other may also increase, and when one decreases, the other also decreases.

The signal change amount calculation part 106 may calculate the first change amount and the second change amount based on a difference between an output signal at the current time and an output signal at the past time or an output signal immediately before the output signal is obtained. In addition, the signal change amount calculation part 106 may derive an approximate equation for change of the output signal over time using a least squares method from a time at which three or more signals including an output signal at the current time, an output signal immediately before the output signal is obtained, and an output signal in the past are obtained, and derive the first change amount and the second change amount based on a slope of an approximate equation or other coefficients.

In the optical concentration measuring device 100 illustrated in FIG. 1, the signal change amount calculation part 106 does not receive the output from the smoothing filter 103. However, a signal change amount calculation part 106 in another example may receive the output from the smoothing filter 103. A value of a signal (smoothed signal) based on the output signal smoothed by the smoothing filter 103 may be used as the acquisition values at the current time and the past time. Since the smoothed signal is a signal obtained by smoothing the output signal, the value of the smoothed signal is a value based on the output signal.

More specifically, for example, the signal change amount calculation part 106 may calculate the first change amount and the second change amount based on a difference between the value of the output signal at the current time and the value of the smoothed signal at the past time or immediately before the output signal is obtained. In this case, the value obtained by smoothing the output signal using the smoothing filter different from the smoothing filter 103 may be used as the value of the output signal at the current time in order to prevent the difference between the output signals appearing to be greater or smaller due to noise included in the output signals.

Further, for example, the signal change amount calculation part 106 may generate a value based on a difference or a ratio between the value of the smoothed signal at the current time and the value of the smoothed signal at the past time or immediately before the smoothed signal is obtained, as the first change amount and the second change amount (referred to as the change amounts in the smoothed signal).

Further, the signal change amount calculation part 106 may generate a value based on a difference or a ratio between the value of the output signal at the current time and the value of the smoothed signal at the past time or immediately before the output signal is obtained, as the first change amount and the second change amount (referred to as the change amounts in the first and the second non-smoothed signals).

Further, in this case, when the change amount in a non-smoothed signal is larger than a predetermined value, the signal change amount calculation part 106 may distinguish between whether a large amount of change in the non-smoothed signal is derived from an increase in the noise included in the output signal due to, for example, a change in ambient temperature or from a great change in the output signal due to a change in the concentration of the measurement target molecules by referring to the change amount in the smoothed signal. A specific example of operation in this case will be described below. Alternatively, the signal change amount calculation part 106 may use the same value as the first change amount and the second change amount.

Figure 3:
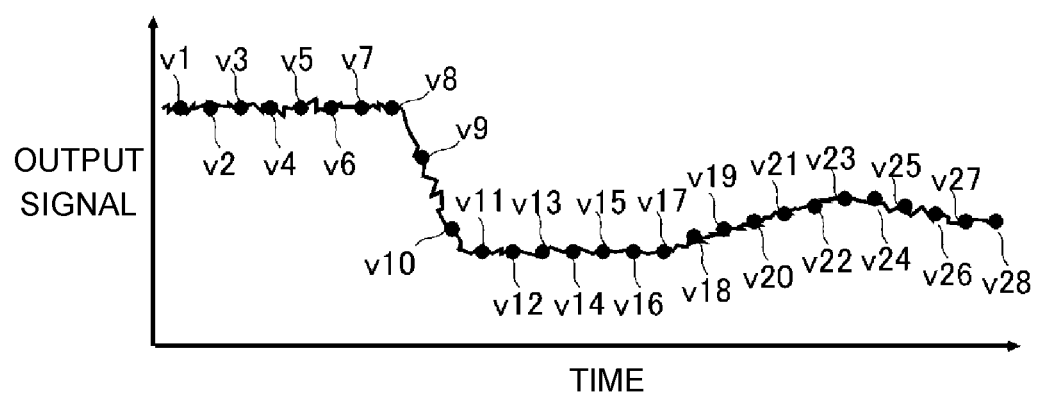
FIG. 3 is a diagram illustrating an example of an output signal and an acquisition value of a light detection part.

FIG. 3 is a diagram illustrating an example of the output signal and the acquisition value of the light detection part 102. The vertical axis in FIG. 3 indicates an intensity of an output signal in a wavelength band corresponding to the measurement target molecules. The horizontal axis in FIG. 3 indicates time. The light detection part 102 may generate a value v of the output signal measured at predetermined time intervals as indicated by a circle in FIG. 3. In this example, the value v of the output signal is set as the acquisition value.

At respective times, the signal change amount calculation part 106 selects two or more acquisition values having a preset relationship from among acquisition values in time series as the selected acquisition values, and calculates the first change amount and the second change amount. As described above, the signal change amount calculation part 106 may select the acquisition values in a predetermined time range as the selected acquisition values. The light source control part 104 and the filter control part 105 control the light source 101 and the smoothing filter 103 based on the first change amount and the second change amount that are given.

(Control Method in Light Source Control Part and Filter Control Part)

As described above, in the optical concentration measuring device 100, there is a trade-off relationship between the measurement precision, the responsiveness, the power saving performance of the light source, and the lifespan of the light source. In the device of the related art, light sources, filters, and the like are designed and balanced according to required performance. That is, when the lifespan of the light source is extended, this is accompanied by a corresponding degradation of the measurement precision and/or the degradation of responsiveness.

On the other hand, the optical concentration measuring device 100 controls the driving power of the light source 101 based on a temporal change amount of the acquisition value based on the output signal of the light detection part 102, that is, based on the first change amount calculated from at least two selected acquisition values selected from the acquisition values based on the output signal at the current time and past time, and controls the characteristics of the smoothing filter 103 based on the second change amount calculated from at least two selected acquisition values selected from the acquisition values based on the output signals at the current time and the past time. Accordingly, it is possible to improve the power saving performance of the light source and to extend the lifespan of the light source while suppressing a degradation of the measurement precision and degradation of the responsiveness.

Figure 4:
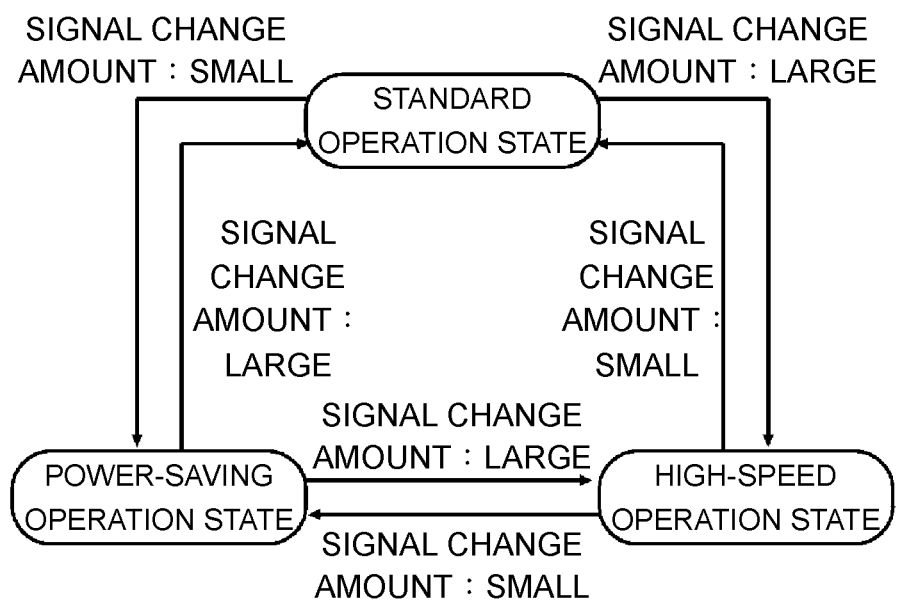
FIG. 4 is a diagram illustrating an example of a transition between operation states of the optical concentration measuring device.

FIG. 4 is a diagram illustrating an example of transition of an operation state of the optical concentration measuring device 100. First, a state in which the optical concentration measuring device 100 is operating according to a power supply condition for a certain predetermined light source 101 and the filter characteristics of the smoothing filter 103 is set to a standard operation state. Here, according to content of the control provided in the disclosure, for example, when the first change amount generated from the signal change amount calculation part 106 is smaller than a predetermined reference value in the standard operation state, that is, a temporal change in the concentration of the measurement target molecules is expected to be less than a certain value, it is possible to improve the power saving performance by decreasing the power supplied to the light source 101 as compared with that in the standard operation state. The light source control part 104 may notify the light detection part 102 or a device that calculates the concentration of the measurement target molecules of the information on the power supplied to the light source 101. In this case, the light detection part 102 may adjust the output signal in consideration of the power supplied to the light source 101, or the device may calculate the concentration of the measurement target molecules in consideration of the power supplied to the light source 101. Specifically, when the power supplied to the light source 101 is decreased below that in the standard operation state, the output signal is also decreased according to the decrease in the supplied power. However, of course, since this change in the output signal is not due to a change in the concentration of the measurement target molecules, the change in the output signal should be ignored. For example, in a case in which the output signal is proportional to the power supplied to the light source 101, the output signal may be multiplied by a gain of 200%, for example, when the power supplied to the light source 101 is 50% of the power in the standard operation state, thereby compensating for the reduction in the output signal due to the reduction in the supplied power.

On the other hand, at the same time, the degree of SNR improvement due to the smoothing filter 103 is increased according to the second change amount so as to compensate for the influence of the decrease in the SNR of the output signal generated by the light detection part 102 due to the reduction in the power supplied to the light source 101 and avoid or suppress degradation of the measurement precision of the optical concentration measuring device 100. This state is set to a power saving operation state.

As an example, in acquisition values v1 to v7 in FIG. 3, the change amount in the acquisition value per unit time is relatively small. The light source control part 104 and the filter control part 105 may set the light source 101 and the smoothing filter 103 to a power saving operation state in such a section.

In this case, as the degree of SNR improvement due to the smoothing filter 103 becomes higher, the responsiveness of the optical concentration measuring device 100 becomes degraded as compared with that in the standard operation state, but since the temporal change in the concentration of the measurement target molecules is expected to be gentler than a certain value, it is less necessary to perform the measurement with fast responsiveness. Accordingly, an influence of degradation in responsiveness on the characteristics of the optical concentration measuring device 100 is substantially small.

More specifically, for the control of the power supplied to the light source 101 and the filter characteristics of the smoothing filter 103, the filter characteristics of the smoothing filter 103 may be controlled, for example, so that the SNR becomes constant even when the power supplied to the light source 101 is decreased. For example, particularly, in a case in which a quantum type element, an MEMS heater, or the like is used as the light source 101 and a case in which the quantum type element, the MEMS heater, or the like is pulse driven and a pulse width thereof is controlled, the SNR is expected to be multiplied by $1/\sqrt{2}$ when the power supplied to the light source 101 is halved, for example, through halving of the pulse width. Therefore, control may be performed so that the degree of SNR improvement due to the smoothing filter 103 becomes $\sqrt{2}$ times. In this case, for example, in a case in which a simple moving average filter is used as the smoothing filter 103, an SNR of the signal generated from the smoothing filter is maintained before and after the pulse width is halved when the number of points to be averaged is set to a multiple of the number of points to be averaged in a state before the pulse width is halved.

Further, for example, when the second change amount generated from the signal change amount calculation part 106 is larger than a predetermined reference value in the standard operation state, that is, when the temporal change in the concentration of the measurement target molecules is expected to be greater than a certain value, the degree of improvement of SNR by the smoothing filter 103 may be lowered as compared with the case of the standard operation state so as to ensure the responsiveness of the optical concentration measuring device 100 necessary for conforming to a temporal change in the output signal, that is, the temporal change in the concentration of the measurement target molecules. This state is set as a high-speed operation state.

As an example, in acquisition values v8 to v10 in FIG. 3, the change amount of the acquisition value per hour is relatively large. The light source control part 104 and the filter control part 105 may set the light source 101 and the smoothing filter 103 to a high-speed operation state in such a section.

In this case, by lowering the degree of SNR improvement due to the smoothing filter 103, the measurement precision of the optical concentration measuring device 100 is lowered, that is, measurement noise is increased as compared with the case of the standard operation state. However, at this time, since it is expected that the temporal change in the concentration of the measurement target molecules will be greater than the certain value, a change in the measured value due to a change in the concentration of the measurement target molecules is sufficiently large and a substantial influence of noise is reduced, as compared with the case of the noise increasing with degradation of the measurement precision. Further, as another example of operation, when the temporal change in the concentration of the measurement target molecules is too steep at the beginning, the concentration of the molecules is likely to be nonuniform in an environment of the measurement target. Therefore, precise local measurement of a surrounding environment in which the optical concentration measuring device 100 is disposed is determined not to be meaningful, and degradation of measurement precision in the high-speed operation state may be compromised. The filter control part 105 may notify a device that calculates the concentration of the measurement target molecules of the SNR being lowered. The device may inform the calculated concentration of the measurement target molecules in association with information indicating a measurement result in a state in which the SNR is lowered. Alternatively, the power supplied to the light source 101 may be increased as compared with in the standard operation state according to the first amount of change so as to compensate for the decrease in the SNR of the smoothed signal and avoid or suppress degradation of the measurement accuracy of the optical concentration measuring device 100.

In the power saving operation state, when the first change amount becomes larger than a predetermined reference value, the optical concentration measuring device 100 may transition to the standard operation state. A reference value for a transition from the power saving operation state to the standard operation state may be larger than a reference value for a transition from the standard operation state to the power saving operation state. However, the reference value for a transition from the power saving operation state to the standard operation state is smaller than the first change amount that is expected when the second change amount becomes larger than a predetermined reference value and a transition from the standard operation state to the high-speed operation state occurs. Accordingly, it is possible to suppress frequent occurrence of the state transition. Further, when the first change amount in the power saving operation state becomes larger than a reference value for a transition to the high-speed operation state, the optical concentration measuring device 100 may transition from the power saving operation state to the high-speed operation state without passing through the standard operation state.

As an example, in acquisition values v11 to v17 in FIG. 3, the change amount of the acquisition value per unit time is relatively small. The light source control part 104 and the filter control part 105 may set the light source 101 and the smoothing filter 103 to a power saving operation state in such a section. Further, for example, in acquisition values v18 to v28 in FIG. 3, the change amount of the acquisition value per unit time is about medium. The change amount is larger than the reference value for a transition from the power saving operation state to the standard operation state and smaller than a reference value for a transition to the high-speed operation state. In this case, the light source control part 104 and the filter control part 105 may set the light source 101 and the smoothing filter 103 to the standard operation state in such a section.

In the high-speed operation state, when the second change amount becomes smaller than the predetermined reference value, the optical concentration measuring device 100 may transition to the standard operation state. A reference value for a transition from the high-speed operation state to the standard operation state may be smaller than the reference value for a transition from the standard operation state to the high-speed operation state. However, the reference value for a transition from the high-speed operation state to the standard operation state is smaller than the second change amount that is expected when the first change amount becomes smaller than the predetermined reference value and a transition from the standard operation state to power saving operation state occurs. Accordingly, it is possible to suppress frequent occurrence of the state transition. Further, when the first change amount becomes smaller than the reference value for a transition to the power saving operation state in the high-speed operation state, the optical concentration measuring device 100 may transition from the high-speed operation state to the power saving operation state without passing through the standard operation state.

Further, the first reference value and the second reference value are used as the reference values for a comparison of the first change amount with the second change amount. When the first change amount is smaller than the first reference value and the second change amount is smaller than the second reference value, the light source control part decreases the power to be supplied to the light source and the filter control part increases a degree of smoothing of the smoothing filter in the expectation that the temporal change in the concentration of the measurement target molecules will be gentler than a certain value, thereby transitioning to the power saving operation state described above.

Accordingly, even when only one of the first change amount and the second change amount is below the reference value accidentally due to noise or the like in a case in which a true transition to the power saving operation state is not intended, it is possible to avoid the transition to the power saving operation state.

Further, the third reference value and the fourth reference value may be used as the reference values for a comparison of the first change amount with the second change amount. When the first change amount is larger than the third reference value and the second change amount is larger than the fourth reference value, the light source control part increases the power to be supplied to the light source and the filter control part decreases a degree of smoothing of the smoothing filter in the expectation that the temporal change in the concentration of the measurement target molecules is greater than the certain value, thereby transitioning to the high-speed operation state described above.

In this way, even when only one of the first change amount and the second change amount exceeds the reference value accidentally due to noise or the like in a case in which a true transition to the high-speed operation state is not intended, it is possible to avoid the transition to the high-speed operation state due to this.

As described above, the driving power of the light source 101 is controlled based on the temporal change amount of the value based on the output signal of the light detection part 102, that is, based on the first change amount calculated from at least two selected acquisition values selected from the acquisition values based on the output signal at the current time and past time, and simultaneously, the characteristics of the smoothing filter 103 is controlled based on the second change amount calculated from at least two selected acquisition values selected from the acquisition values based on the output signals at the current time and the past time. Thus, it is possible to improve the power saving performance of the light source and to extend the lifespan of the light source while suppressing a degradation of the measurement precision and degradation of the responsiveness of the optical concentration measuring device 100 as compared with a case in which the optical concentration measuring device 100 is always operated in the standard operation state.

In the above example, the control of the driving power of the light source 101 (hereinafter simply referred to as power control in some cases) and the control of the characteristics of the smoothing filter 103 (hereinafter simply referred to as filter control in some cases) are simultaneously performed, but the disclosure is not limited thereto. Further, the power control and the filter control may be performed at different times. Further, one of the power control and the filter control need not always accompany the other. Both the power control and the filter control may be performed only in an arbitrary time range or only when the output signal or the calculated concentration is in a certain output range.

For example, using the above-described example, when the second change amount generated from the signal change amount calculation part 106 is smaller than a predetermined reference value A in the standard operation state, that is, when the temporal change in the concentration of the measurement target molecules is expected to be gentler to some extent than the certain value, a degree of SNR improvement due to the smoothing filter 103 may be first increased, and then, only when the first change amount becomes smaller than a predetermined reference value B, that is, only when the temporal change in the concentration of the measurement target molecules is expected to be much gentler than the certain value, the degree of SNR improvement due to the smoothing filter 103 may be further increased while the power supplied to the light source 101 is being decreased as compared with that in the standard operation state. In this case, only when the second change amount is smaller than the reference value A, setting of the reference value and calculation of the change amount may be performed so that the first change amount can be smaller than the reference value B. By performing the control in this way, the SNR or the response speed can be changed more smoothly or more uniformly.

Further, for example, in the above-described example, when the degree of SNR improvement due to the smoothing filter 103 is increased while the power supplied to the light source 101 is being decreased as compared with that in the standard operation state, the power supplied to the light source 101 may be reduced after a predetermined time has passed after the degree of SNR improvement due to the smoothing filter 103 has increased. In this case, when the first change amount becomes larger than a predetermined reference value again before the power supplied to the light source 101 is decreased after the degree of SNR improvement due to the smoothing filter 103 has increased, the reduction in the power supplied to the light source 101 may be canceled. Through this control, it is possible to compensate for temporary reduction in the first change amount, which is derived from imperfection in a change amount calculation method of the signal change amount calculation part. In this case, a period from an increase in the degree of SNR improvement due to the smoothing filter 103 to a decrease in the power supplied to the light source 101 may be within 10 measurement cycles for the concentration of the measurement target molecules or within an elapsed time of 10 minutes. When the period is too long, the effect of improvement of the power saving performance of the light source may be weak.

Further, in the above-described example, three states including the standard operation state, the power saving operation state, and the high-speed operation state are used, but the disclosure is not limited thereto. Only two of the three states may be used. Further, one state may be divided into a plurality of states by performing parameter control for controlling the one state based on the first change amount and the second change amount in a stepwise manner. For example, in the power saving operation state, the light source control part 104 may control a level of power supplied to the light source 101 in a stepwise manner according to a level of the first change amount. Similarly, the filter control part 105 may control a degree of smoothing in the smoothing filter 103 in a stepwise manner according to a level of the second change amount.

Further, in the above example, the control conditions of the light source 101 and the filter characteristics conditions of the smoothing filter 103 are changed only when the first change amount and the second change amount are smaller or larger than the predetermined reference value, but the control method is not limited to the aspect in which the reference value is used. For example, a function having the first change amount as an input and the control conditions of the light source 101 as an output may be prepared. Further, for example, a function having the second change amount as an input and the filter characteristics conditions of the smoothing filter 103 as an output may be prepared. In these cases, continuous change of the control conditions of the light source 101 or the filter characteristics conditions of the smoothing filter 103 is performed on the first change amount and the second change amount.

Further, for example, a difference between the smoothed signal at the current time and the smoothed signal at the past time or immediately before the smoothed signal is obtained may be used as the first change amount and the second change amount. In this case, suppression of the influence of degradation of responsiveness in the optical concentration measuring device 100 may be weakened, but an influence of the noise can be alleviated when the power to be supplied to the light source or filter characteristics of the smoothing filter are controlled on the basis of the first change amount and the second change amount.

Further, for example, both of the change amount of the smoothed signal and the change amount of the non-smoothed signal may be used as the first change amount and the second change amount, as described above. At this time, for example, when the change amount of the smoothed signal is smaller than the reference value even though the change amount of the non-smoothed signal is larger than the reference value or a state in which the change amount of the non-smoothed signal is larger than the reference value continues for a while, it may be simply determined that noise included in the output signal is highly likely to be relatively large due to, for example, a change in a temperature of an environment where the optical concentration measuring device 100 is placed. In this case, even when the change amounts of the non-smoothed signal respectively corresponding to the first change amount and the second change amount are larger than the predetermined reference value, the filter control part 105 may not perform control to decrease the degree of SNR improvement due to the smoothing filter 103 since the SNR of the output signal and the measurement precision of the optical concentration measuring device 100 are degraded and it is not necessary to improve responsiveness. However, in order to compensate for the degraded measurement precision, the light source control part 104 may increase the power supplied to the light source 101. Alternatively, in order to compensate for the degraded measurement precision, the filter control part 105 may perform control to increase the degree of SNR improvement due to the smoothing filter 103.

Further, when a current change amount of the non-smoothed signal is larger than the reference value or a state in which the current change amount is larger than the reference value continues for a longer period of time than a predetermined period of time, and the current change amount of the smoothed signal is also larger than the reference value, it may determine that the output signal is highly likely to be changed due to a change in the concentration of the measurement target molecules. In this case, the light source control part 104 and the filter control part 105 may transition to the high-speed operation state described above or a state conforming thereto in order to conform to the change in the concentration of the measurement target molecules.

Further, in the above example, the power supply conditions to the light source 101 are controlled based on the first change amount, and the filter characteristics conditions of the smoothing filter 103 are controlled based on the second change amount. However, the same value may be used as the first change amount and the second change amount.

Further, the filter control part 105 may control the smoothing filter 103 so that the SNR of the smoothing filter 103 becomes constant when the power supplied to the light source 101 changes. In this case, the SNR of the smoothing filter 103 may not be strictly kept constant. The filter control part 105 adjusts the filter characteristics of the smoothing filter 103 in a direction in which a change in the SNR due to a change in the power supplied to the light source 101 is compensated for.

Figure 5:
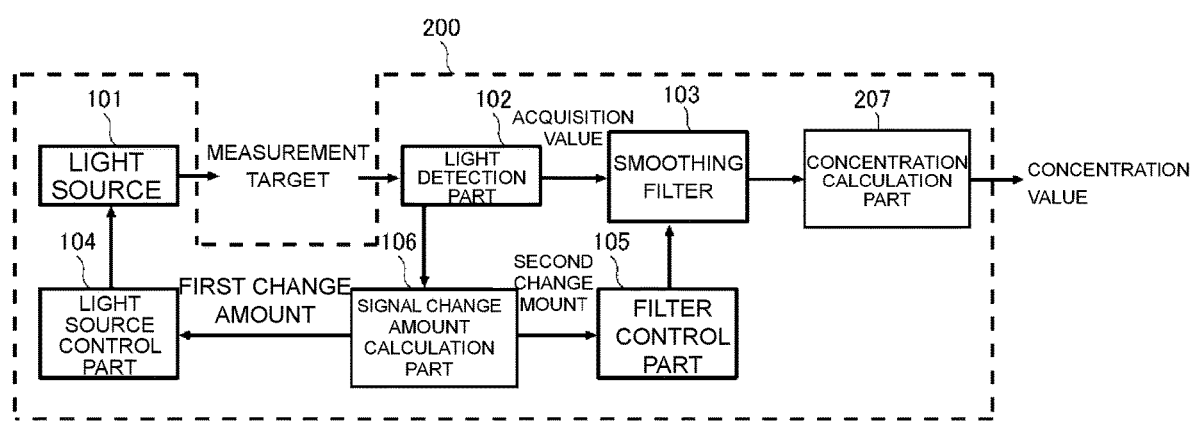
FIG. 5 is a diagram illustrating a configuration example of an optical concentration measuring device according to another embodiment of the disclosure.

FIG. 5 is a diagram illustrating a configuration example of an optical concentration measuring device 200 according to another embodiment of the disclosure. The optical concentration measuring device 200 further includes a concentration calculation part 207, in addition to the configuration of the optical concentration measuring device 100. The configuration other than the concentration calculation part 207 is the same as the configuration described in FIGS. 1 to 4. Also, in the optical concentration measuring device 200 of this example, it is possible to improve the power saving performance of the light source 101 and to extend the lifespan of the light source while suppressing a decrease in SNR and a degradation of responsiveness in concentration measurement.

The concentration calculation part 207 calculates a concentration value of measurement target molecules based on at least one of the acquisition values based on the output signal of the light detection part 102 and the acquisition value smoothed by the smoothing filter 103. The concentration calculation part 207 illustrated in FIG. 5 calculates the concentration value of the measurement target molecules based on the acquisition value smoothed by the smoothing filter 103.

Types, structures, and the like of the concentration calculation part 207 are not particularly limited as long as the concentration calculation part 207 can calculate the concentration value of the measurement target molecules based on the output signal or the like. As the concentration calculation part 207, for example, a digital circuit including a microcontroller, an LSI, or the like can be used. In order to calculate the concentration value based on the output signal or the like, the concentration calculation part 207 may internally store a relationship between the value of the output signal or the like and the concentration value as a table or a function. The table or the function may be stored in the concentration calculation part 207 at the time of calibration of the optical concentration measuring device 200.

In the optical concentration measuring device 200 illustrated in FIG. 5, a signal (smoothed signal) based on the output signal smoothed by the smoothing filter 103 is given as the value based on the output signal to the concentration calculation part 207 and the concentration value is generated, but the disclosure is not limited thereto. For example, when the concentration value is calculated, not only the smoothed signal but also the output signal may be used for concentration calculation as necessary.

Figure 6:
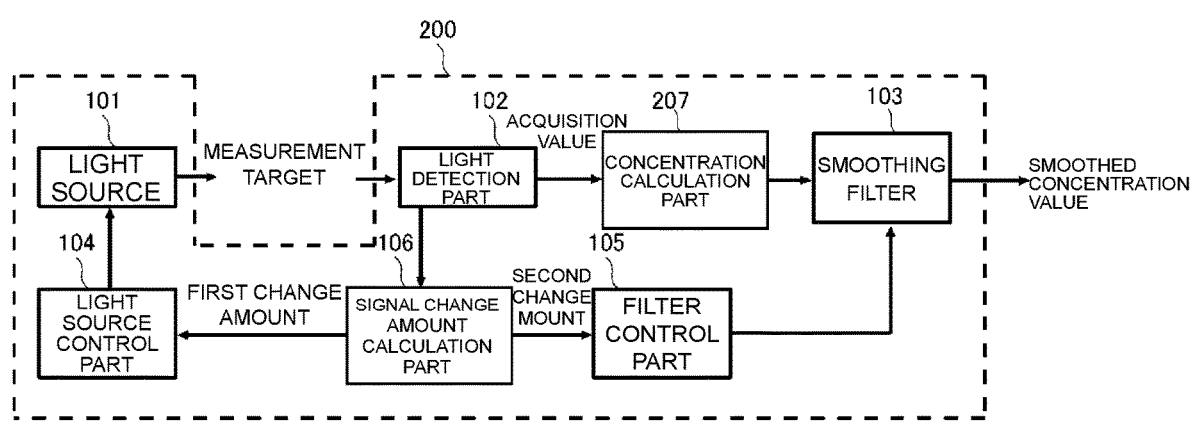
FIG. 6 is a diagram illustrating a modification example of the optical concentration measuring device.

FIG. 6 is a diagram illustrating a modification example of the optical concentration measuring device 200. The optical concentration measuring device 200 of this example differs from the optical concentration measuring device 200 illustrated in FIG. 5 in that the concentration calculation part 207 receives the output signal of the light detection part 102 and inputs a concentration value to the smoothing filter 103. The concentration calculation part 207 calculates a concentration value of the measurement target molecules based on the output signal of the light detection part 102 and inputs the concentration value to the smoothing filter 103. The smoothing filter 103 smooths the concentration value of the measurement target molecules in a time domain and generates a resultant concentration value.

Figure 7:
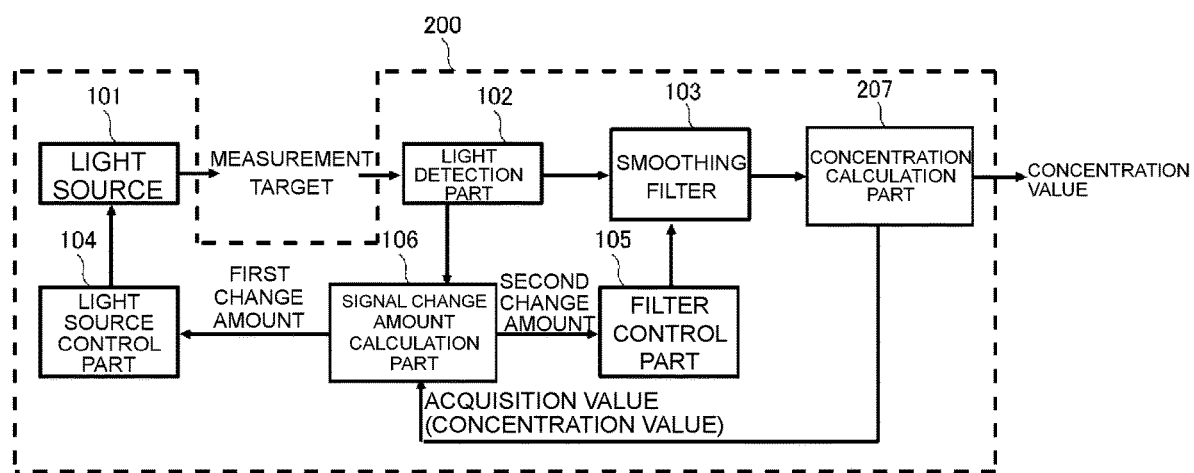
FIG. 7 is a diagram illustrating a modification example of the optical concentration measuring device.

FIG. 7 is a diagram illustrating a modification example of the optical concentration measuring device 200. An optical concentration measuring device 200 of this example is different from the optical concentration measuring device 200 illustrated in FIG. 5 or 6 in that the concentration value generated by the concentration calculation part 207 illustrated in FIG. 5 or 6 is used as at least one of the acquisition values that are given to the signal change amount calculation part 106. Other configurations are the same as those of the optical concentration measuring device 200 illustrated in FIG. 5 or 6.

Further, in the optical concentration measuring device 200 of this example, the value generated by the smoothing filter 103 illustrated in FIG. 5 or 6 may be used as at least one of the acquisition values that are given to the signal change amount calculation part 106. The signal change amount calculation part 106 may use the concentration value or the concentration value smoothed by the smoothing filter 103 as at least one of the selected acquisition values. More specifically, the signal change amount calculation part 106, for example, may calculate the first change amount and the second change amount based on a difference between a concentration value at a current time and a concentration value at a past time or a concentration value immediately before the concentration value is obtained.

Figure 8:
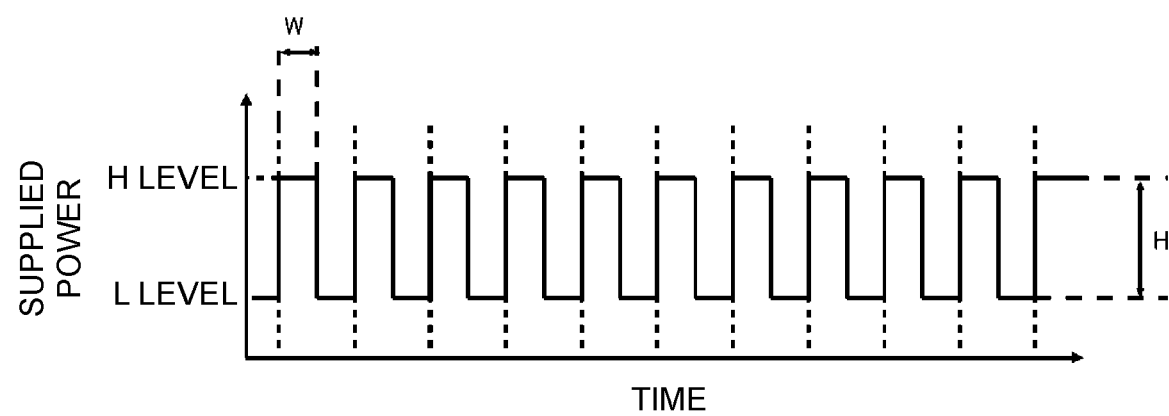
FIG. 8 is a diagram illustrating an example of a waveform of power supplied to a light source.

FIG. 8 is a diagram illustrating an example of a waveform of the power supplied to the light source 101. In this example, the waveform of the power supplied to the light source 101 is a pulse shape. That is, in the power waveform, a state in which the power is at a predetermined H level and a state in which the power is in a predetermined L level are alternately repeated.

The light source control part 104 may control a pulse width W in the power waveform based on the first change amount. That is, the light source control part 104 may perform a pulse width modulation on the power supplied to the light source 101.

The light source control part 104 may control a pulse height H of the power waveform based on the first change amount. That is, the light source control part 104 may perform amplitude modulation on the power supplied to the light source 101. The light source control part 104 may control the power waveform by combining pulse width modulation and amplitude modulation.

(Verification of Design Example and Effects)

Next, effects of the optical concentration measuring device 100 will be more specifically verified. For example, the optical concentration measuring device 100 is a $CO_2$ gas sensor using an infrared LED (AK9700AE) and an infrared sensor (AK9710AE) for measurement of a carbon dioxide concentration. The optical concentration measuring device 100 of this example calculates the $CO_2$ gas concentration in a measurement target space by detecting the amount of light at a wavelength near 4.3 μm absorbed by $CO_2$ gas. The optical concentration measuring device 100 may be a non-dispersive infrared (NDIR) type concentration measuring device, but is not limited thereto.

The light source 101 is driven using constant current pulse driving. The light source control part 104 inputs a driving current having a pulse width (hereinafter referred to as a driving current pulse width) determined for each predetermined measurement cycle to the light source 101. In one example, the light source control part 104 determines the driving current pulse width based on the first change amount given by the signal change amount calculation part 106. The light detection part 102 integrates a current generated by receiving a part of the light emitted from the light source 101 and performs an analog-to-digital conversion on a voltage based on the charge amount thereof to obtain an output signal.

The smoothing filter 103 is a first-order low-pass digital filter expressed by Equation (2), and configured by software. In this case, the filter control part 105 determines a value of the coefficient α (hereinafter referred to as an α value) in Equation (2) based on the second change amount given by the signal change amount calculation part 106.

In the optical concentration measuring device 100, portions that determine the driving current pulse width in the signal change amount calculation part 106, the filter control part 105, and the light source control part 104 may be collectively configured by software. The optical concentration measuring device 100 directly determines the driving current pulse width and the α value in a process to be executed by the software using the same values as the first change amount and the second change amount. A flow of the process in the optical concentration measuring device 100 will be described below.

Further, the optical concentration measuring device 100 may include the concentration calculation part 207. The concentration calculation part 207 converts the output signal smoothed by the smoothing filter 103 into a $CO_2$ gas concentration by referring to a conversion table of an output signal and a $CO_2$ gas concentration prepared at the time of calibration in advance and generates a concentration value.

Figure 9:
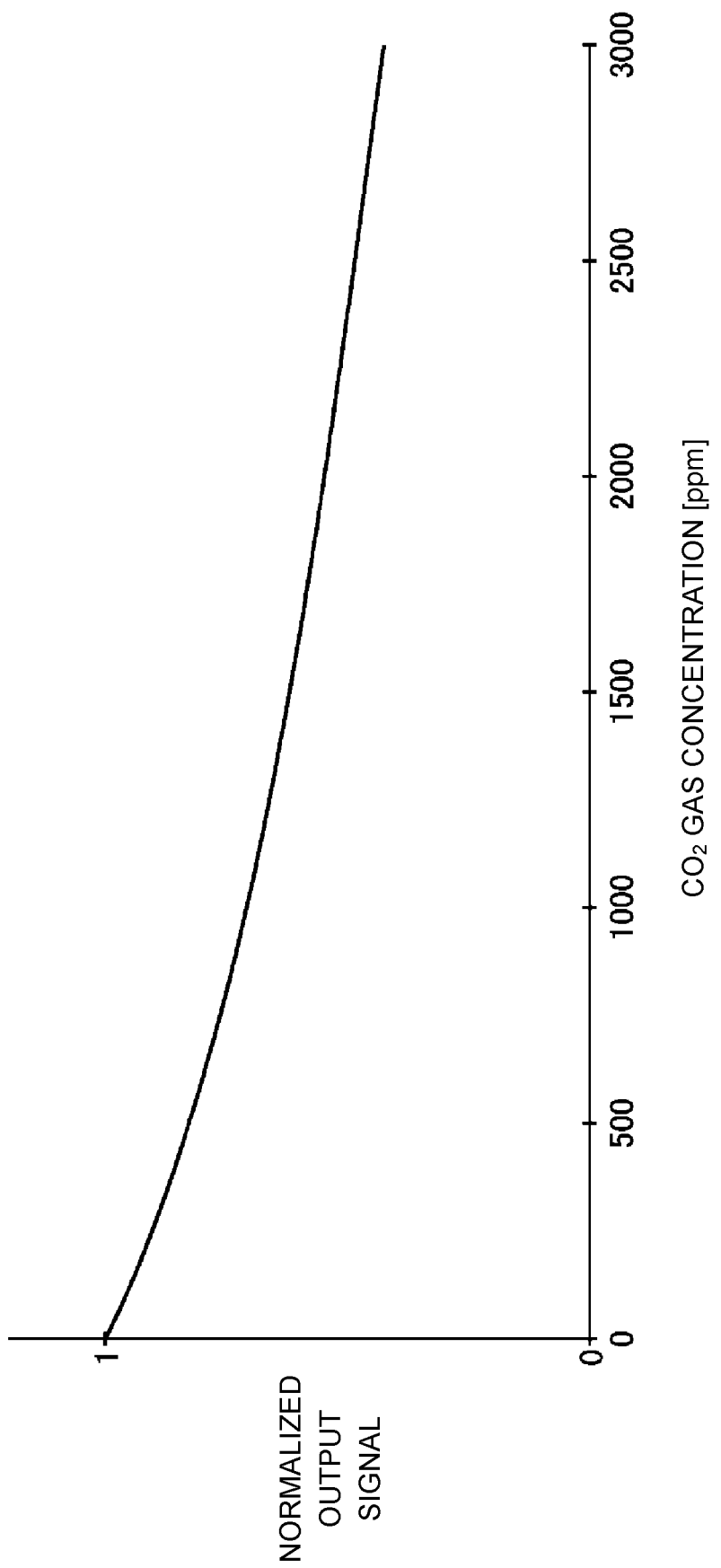
FIG. 9 is a diagram illustrating a relationship between a $CO_2$ gas concentration and an output signal in a standard operation state.

FIG. 9 illustrates a relationship between a $CO_2$ gas concentration and an output signal in the standard operation state. The horizontal axis indicates the $CO_2$ gas concentration in units of ppm. The vertical axis indicates an output signal normalized so that the output signal is 1 in a 0 ppm environment. In FIG. 9, an average value at each measurement point is acquired as a true value using a sufficient time and the number of measurements at the time of measurement. Further, a conversion table of the output signal and the $CO_2$ gas concentration can be created based on FIG. 9.

Figure 10:
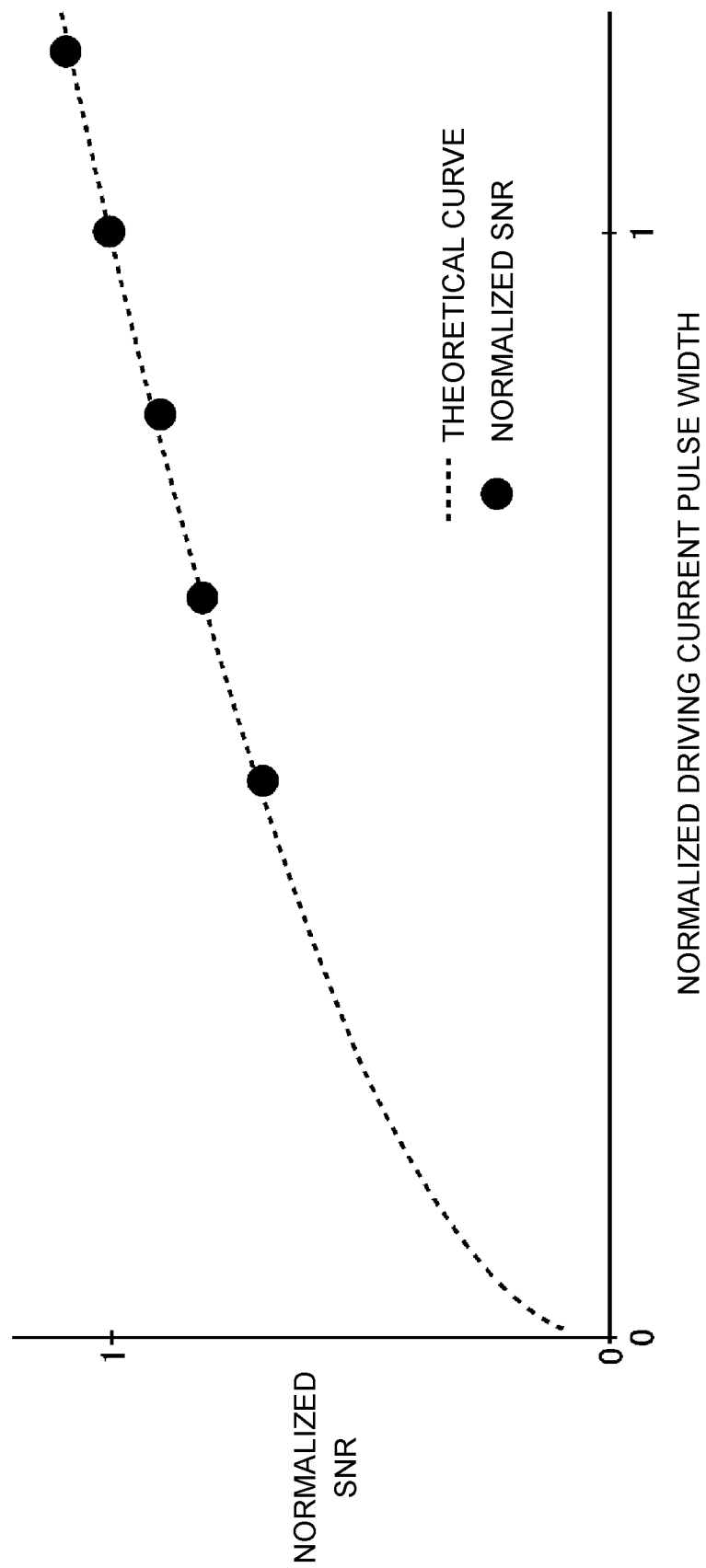
FIG. 10 is a diagram illustrating a relationship between an SNR of the output signal and a driving current pulse width.

FIG. 10 illustrates a relationship between the SNR of the output signal and the driving current pulse width. FIG. 10 illustrates an output signal obtained when the pulse width of the driving current for the light source 101 has been changed as a parameter. The horizontal axis indicates a normalized driving current pulse width. The normalized driving current pulse width is a driving current pulse width normalized so that the driving current pulse width in the standard operation state is 1. The vertical axis indicates the SNR of the output signal normalized so that the SNR of the output signal in the standard operation state is 1. Markers indicate actual measurement values. The broken line indicates a theoretical curve when thermal noise as a type of noise dominates. The theoretical curve is expressed by the following equation (5) with the horizontal axis being x and the vertical axis being y.

$$y=\sqrt{x} \qquad (5)$$

The optical concentration measuring device 100 integrates the output signal for a time for which the light source 101 is emitting light. Therefore, theoretically, the output signal is directly proportional to the driving current pulse width, and the thermal noise is proportional to a ½ power. As a result, the SNR, which is a ratio of a signal to noise, is proportional to a ½ power.

Referring to FIG. 10, the markers satisfactorily match the theoretical curve and the SNR can be theoretically expected to be substantially proportional to the ½ power of the drive current pulse width. That is, for example, when the driving current pulse width is changed to ½ times, the output signal is changed to ½ times and the noise of the output signal is changed to $1/\sqrt{2}$ times. As a result, the SNR becomes $1/\sqrt{2}$ times. Power consumed by the light source 101 can be expected to be ½ times like the driving current pulse width.

Figure 11:
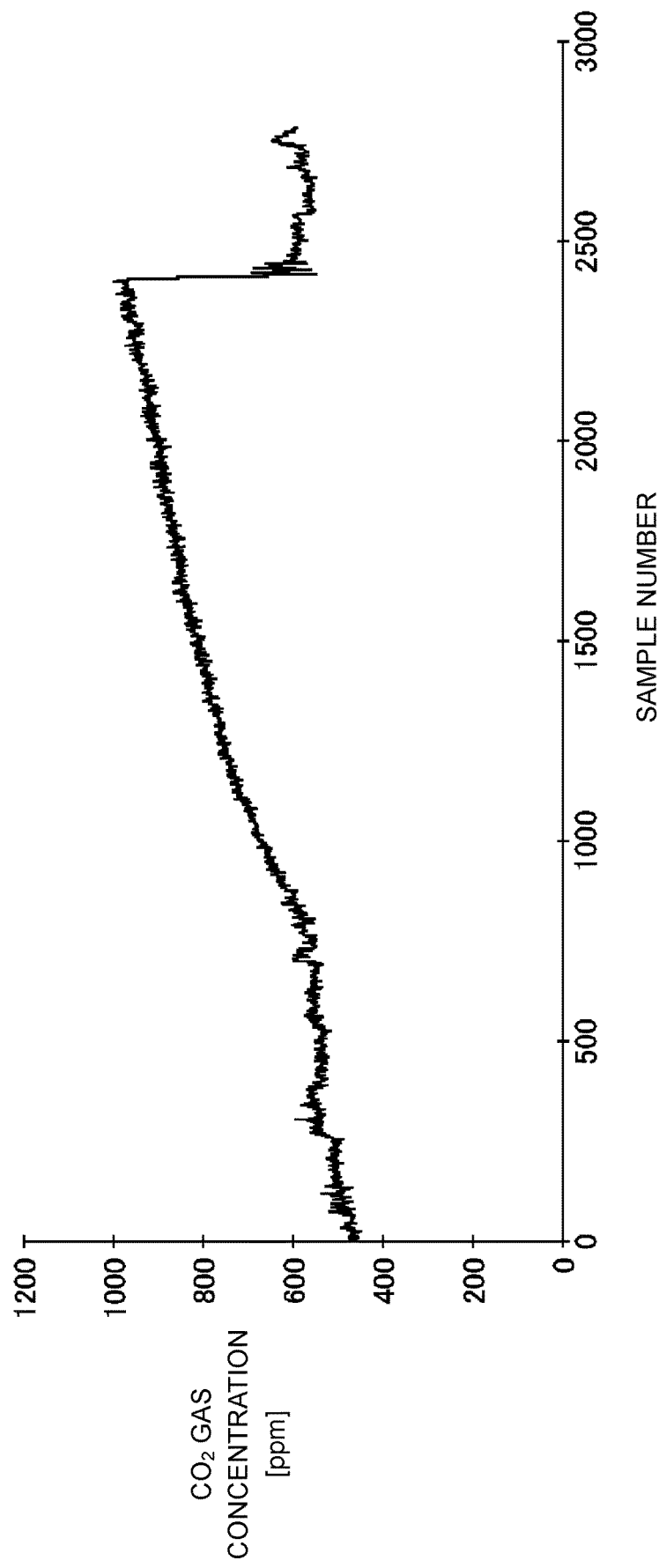
FIG. 11 is a diagram illustrating an actual measurement example of a change in $CO_2$ gas concentration in the optical concentration measuring device.

FIG. 11 illustrates an example of actual measurement of a change in $CO_2$ gas concentration in the optical concentration measuring device 100. The optical concentration measuring device 100 acquires the $CO_2$ gas concentration in a room in which a person lives. Here, in this measurement, the driving current pulse width during the measurement is made constant, and digital filter processing is not executed. The horizontal axis indicates a sample number indicating an order of the measurement results. The vertical axis indicates the $CO_2$ gas concentration in units of ppm measured by the optical concentration measuring device 100.

The measurement was performed approximately every 15 seconds in order from sample number 0. Further, a window of a room was always closed during the measurement. Since a door connected to an adjacent room was open to the vicinity of sample number 750, the $CO_2$ gas concentration was maintained at a relatively low concentration or increased very gently. Thereafter, when the door was closed in the vicinity of sample number 750, the $CO_2$ gas concentration gradually increases, and then, when the door was again open in the vicinity of sample number 2400, the $CO_2$ gas concentration suddenly decreases and returns to a level before the door is closed. The driving current pulse width at the time of this measurement is defined as a standard driving current pulse width.

Next, a model of a true value of a $CO_2$ gas concentration change was prepared from an actual measurement example of a $CO_2$ gas concentration change illustrated in FIG. 11. Simulation was performed using a practical model of an output signal (hereinafter referred to as an output signal model) obtained by adding assumed noise to a model of a true value of an output signal to be inversely calculated from the model of the true value of the $CO_2$ gas concentration change (hereinafter, an output signal true value model). The noise added in this case is a signal of a normal distribution having a standard deviation of the output signal of the optical concentration measuring device 100 obtained in a sealed environment. Further, the true value of the output signal is proportional to the driving current pulse width, and the assumed noise is proportional to a ½ power of the driving current pulse width. This condition satisfies the relationship between the driving current pulse width and the SNR illustrated in FIG. 10.

Figure 12:
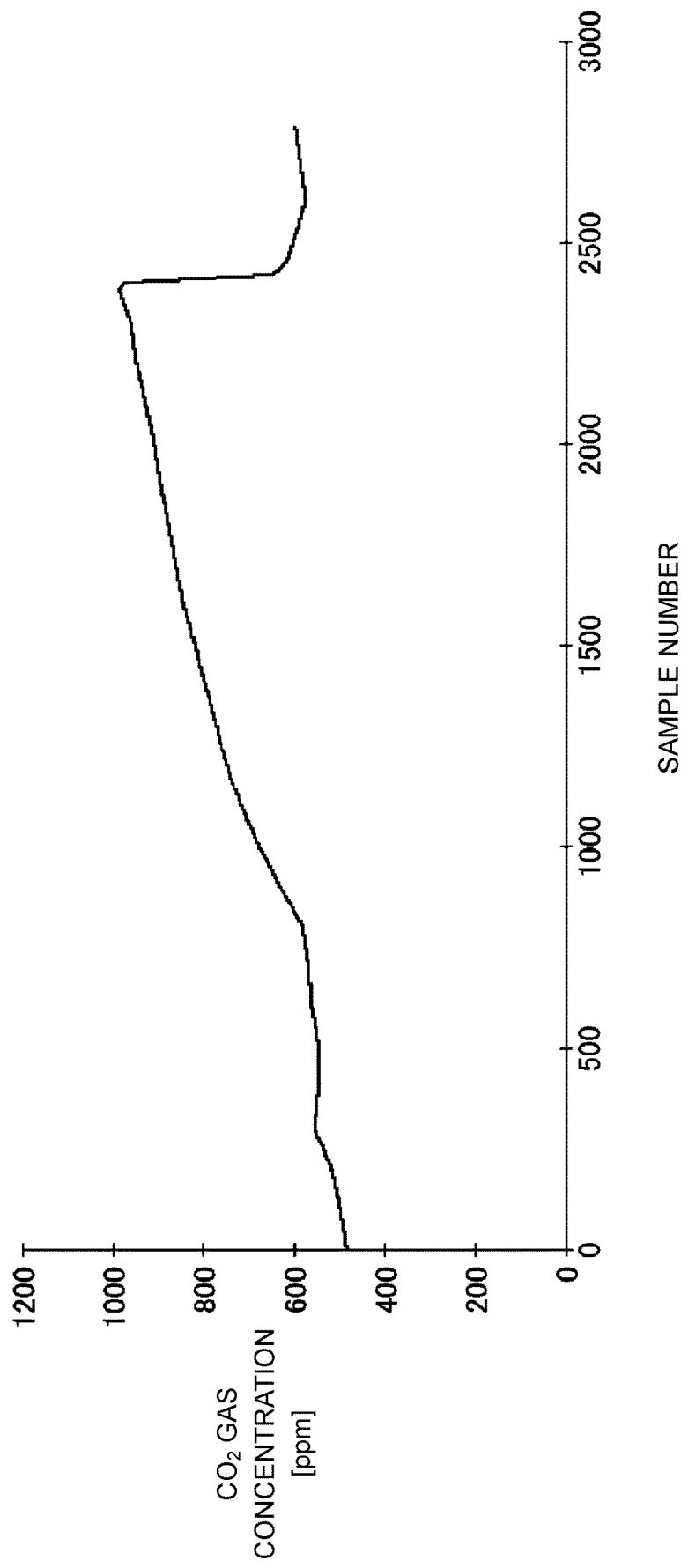
FIG. 12 is a diagram illustrating a result calculating the $CO_2$ gas concentration using an output signal true model.

FIG. 12 illustrates a result obtained by calculating the $CO_2$ gas concentration using the output signal true model. As in FIG. 11, the horizontal axis indicates a sample number, and the vertical axis indicates the $CO_2$ gas concentration in units of ppm calculated using the output signal true model.

Figure 13:
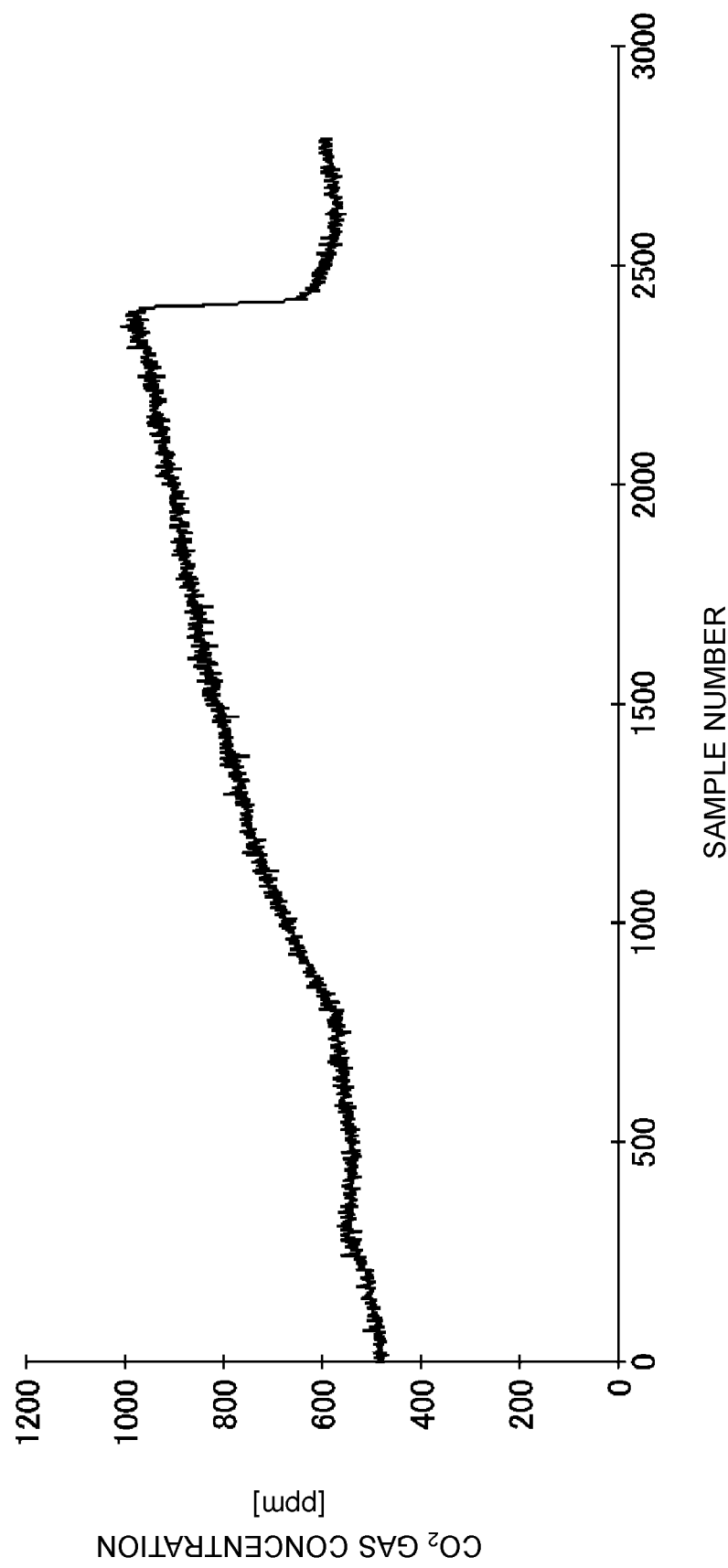
FIG. 13 is a diagram illustrating a result of a simulation of calculating the $CO_2$ gas concentration using an output signal model.

FIG. 13 illustrates a simulation result obtained by calculating the $CO_2$ gas concentration using the output signal model. As in FIG. 11, the horizontal axis indicates a sample number, and the vertical axis indicates the $CO_2$ gas concentration in units of ppm calculated using the output signal model.

As described above, the output signal model is created by adding assumed noise to the output signal true value model. Thus, FIG. 13 is a reproduction of FIG. 11 using the model, and it can be seen that FIG. 13 satisfactorily reproduces FIG. 11.

Figure 14:
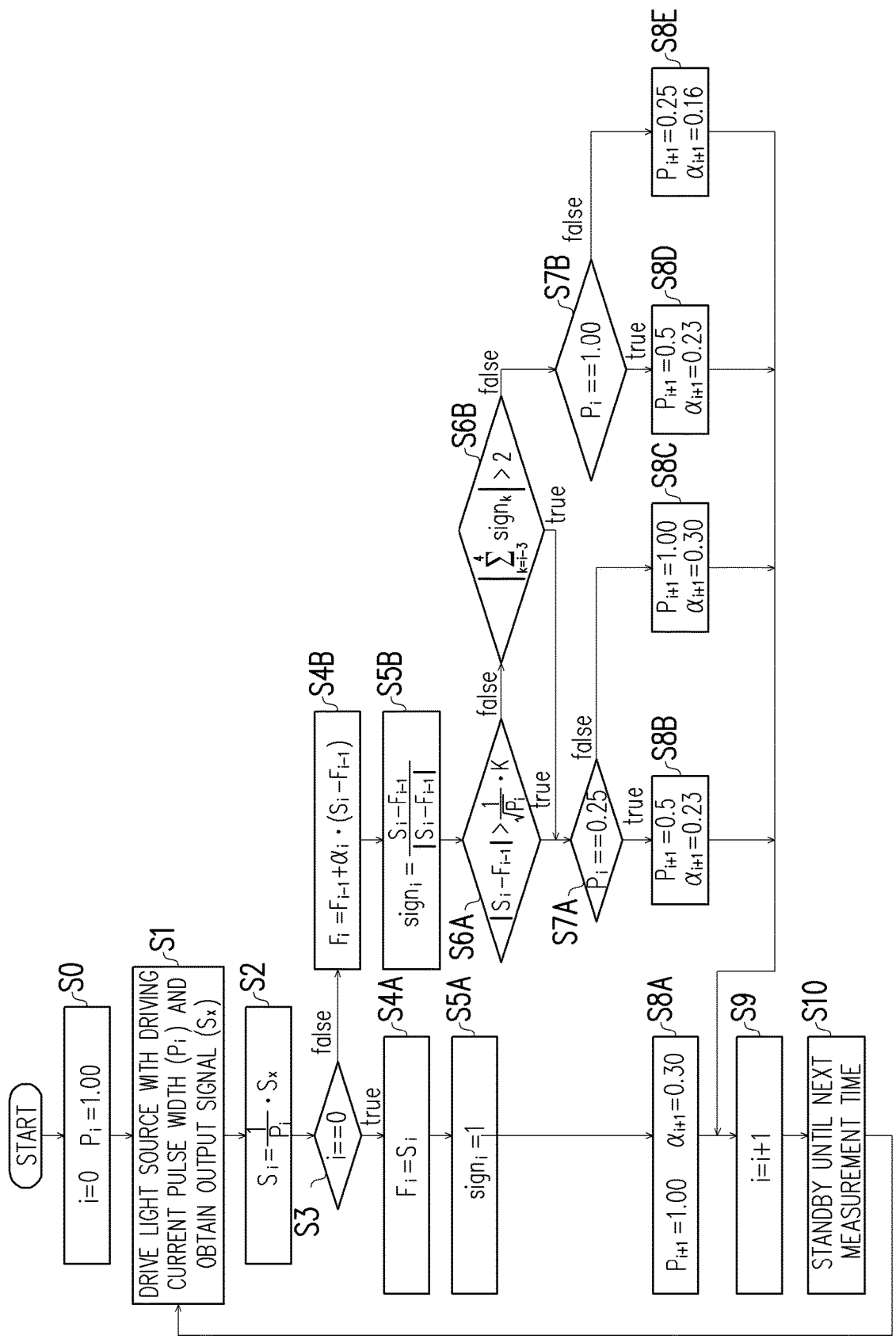
FIG. 14 is a diagram illustrating an example of a flowchart for determining a driving current pulse width and an α value.

FIG. 14 illustrates an example of a flowchart for determining the driving current pulse width and the α value. Description will be given using processes of S0 to S10. Further, for variables used in FIG. 14, i is a counter indicating an order of measurement, P is the normalized driving current pulse width, α is an α value, S is an output signal, F is the output signal smoothed by the smoothing filter 103 (hereinafter referred to as a smoothed output signal), sign is a variable for storing 1 or −1, and K is a constant. The value of K in this design was four times a standard deviation of the output signal before being smoothed when the light source 101 is driven with the standard driving current pulse width.

Further, a subscript indicates an order of measurement in which a variable to which the subscript has been added is used. In the specification, the subscript is shown in parentheses [ ] following each variable for ease of viewing. For example, when x is a variable to which a subscript is added, x[i] in the specification represents $x_i$ in FIG. 14. Further, in this example, the normalized driving current pulse width P is designed to have only three values including 1.00, 0.50, and 0.25. The α value was designed to correspond to three values including 1.00, 0.50, and 0.25 of the normalized driving current pulse width P and to be able to be only 0.30, 0.23, and 0.16 in the same order. The α value was selected so that the SNR when the normalized driving current pulse width P is 1.00 and the α value is 0.30 is maintained even when the normalized driving current pulse width P has a value other than 1.00.

In the series of processes, P[i] and α[i] are determined according to a change of the output signal S. Process S0 is performed only for the first time. Here, i is initialized to 0, and P[i], that is, P[0] is initialized to 1.00. In process S1, an output signal Sx when the light source 101 has been driven with the current (i-th) driving current pulse width P[i] is obtained.

In process S2, a signal obtained by adjusting the output signal Sx obtained in process S1 according to the used normalized driving current pulse width P[i] is set as an output signal S[i]. Through this adjustment, the output signal S[i] has the same level value regardless of the normalized driving current pulse width P[i].

Process S3 splits according to whether i is 0, that is, whether the measurement is an initial measurement. This is because a change in the output signal cannot be obtained at initial measurement.

At the initial measurement (that is, i=0), process S4A is performed following process S3. Here, the output signal S[i] obtained immediately before; that is, S[0] is directly used as the smoothed output signal F[i], i.e., F[0].

Process S5A is performed following process S4A. Here, sign[i], that is, sign[0] is set to 1. Process S8A is performed following process S5A. Here, P[i+1] is set to 1.00 and α[i+1] is set to 0.30 for the next measurement. In process S10, the process is in standby until a next measurement time and process S1 is executed.

On the other hand, in measurements other than the initial measurement (that is, i>0), process S4B is performed following process S3. Here, using the smoothed output signal F[i−1] obtained at the time of the (i−1)-th measurement and α[i] determined at the time of the same (i−1)-th measurement, a low-pass filter is applied to the output signal S[i] obtained at the time of the ith measurement and a result thereof is set as a smoothed output signal F[i].

Process S5B is performed following process S4B. Here, a sign of a difference between the output signal S[i] obtained at the time of the ith measurement and the smoothed output signal F[i−1] obtained at the time of the (i−1)th measurement is a sign[i]. Specifically, when S[i] is greater than F[i−1], sign[i] is 1, and when S[i] is smaller than F[i−1], sign[i] is −1. It should be noted that sign[i]=0 when S[i] and F[i−1] match in a range of calculation accuracy.

Process S6A splits according to whether or not the difference between the output signal S[i] obtained at the time of the ith measurement and the smoothed output signal F[i−1] obtained at the time of the (i−1)th measurement is sufficiently large. A sufficiently large difference means that the difference is not caused by noise and the $CO_2$ gas concentration in an actual measurement environment is highly likely to have greatly changed. In this design, a value based on the standard deviation of the output signal is used as a threshold value for determining whether or not the change is sufficiently large. Specifically, $K/\sqrt{P[i]}$ was used as the threshold value. In this design, K is a constant having a value four times the standard deviation of the output signal before being smoothed, which is obtained when the light source 101 is driven with the standard driving current pulse width, that is, when P=1.00, as described above.

In addition, the output signal S[i] is adjusted according to the normalized driving current pulse width P[i] in process S2. Therefore, when F[i−1] can sufficiently remove the influence of the noise and can be regarded as a true value, a probability of an absolute value of S[i]−F[i−1] exceeding a threshold value due to the influence of the noise can be made constant irrespective of P[i] by dividing K by $\sqrt{P[i]}$.

Process S6B is performed when a determination result of process S6A has been false. Process S6B splits according to whether or not the value of sign up to that point in time is distributed to be biased to a positive side or a negative side to some extent or more. Sufficiently large biasing means that the biasing is not caused by noise and the $CO_2$ gas concentration in the actual measurement environment is highly likely to have been greatly changed. This is because, when the value of S[i] increases or decreases only due to noise, the value of sign is expected to be more evenly scattered. In this design, a determination is made as to whether or not the biasing is sufficiently large according to whether or not an absolute value of a sum of sign[i], sign[i−1], sign[i−2], and sign[i−3] is greater than 2. Here, sign[i]=0 for i<0.

Process S7A is performed when any of determination results of processes S6A and S6B has been true. Process S7A splits according to whether or not the normalized driving current pulse width P[i] in the ith measurement is 0.25.

Process S8B is performed when a determination result of process S7A has been true. In process 8B, the normalized driving current pulse width P[i+1] used at the time of the (i+1)-th measurement is set to 0.50 and the α value α[i+1] is set to 0.23. Further, process S8C is performed when a determination result of process S7A has been false. In process S8C, the normalized driving current pulse width P[i+1] used at the time of the (i+1)-th measurement is set to 1.00, and the α value α[i+1] is set to 0.30.

That is, when it has been determined in process S6A or S6B that the $CO_2$ gas concentration in an actual measurement environment is highly likely to have been greatly changed, the normalized driving current pulse width P and the α value are increased by one step in process S7A, process S8B, and process S8C. The optical concentration measuring device 100 offsets a decrease in SNR caused by the increase in the α value, by increasing the normalized driving current pulse width P. Accordingly, the optical concentration measuring device 100 can suppress the decrease in SNR while ensuring the responsiveness to a large change in the $CO_2$ gas concentration.

Process S7B is performed when determination results of process S6A and process S6B are both false and splits according to whether or not the normalized driving current pulse width P[i] in the ith measurement is 1.00.

Process S8D is performed when the determination result of process S7B has been true. In process S8D, the normalized driving current pulse width P[i+1] used at the time of the (i+1)-th measurement is set to 0.50 and the α value α[i+1] is set to 0.23. Further, process S8E is performed when a determination result of process S7B has been false. In process S8E, the normalized driving current pulse width P[i+1] used at the time of the (i+1)-th measurement is set to 0.25, and the α value α[i+1] is set to 0.16.

That is, when it has been determined in process S6A or S6B that the $CO_2$ gas concentration in the actual measurement environment is less likely to have been greatly changed, the normalized driving current pulse width P and the α value are decreased by one step in process S7B, process S8D, and process S8E. The optical concentration measuring device 100 suppresses the decrease in SNR caused by the decrease in the normalized driving current, by decreasing the α value. Accordingly, the optical concentration measuring device 100 can suppress the decrease in SNR while reducing current consumption of the light source 101.

Figure 15:
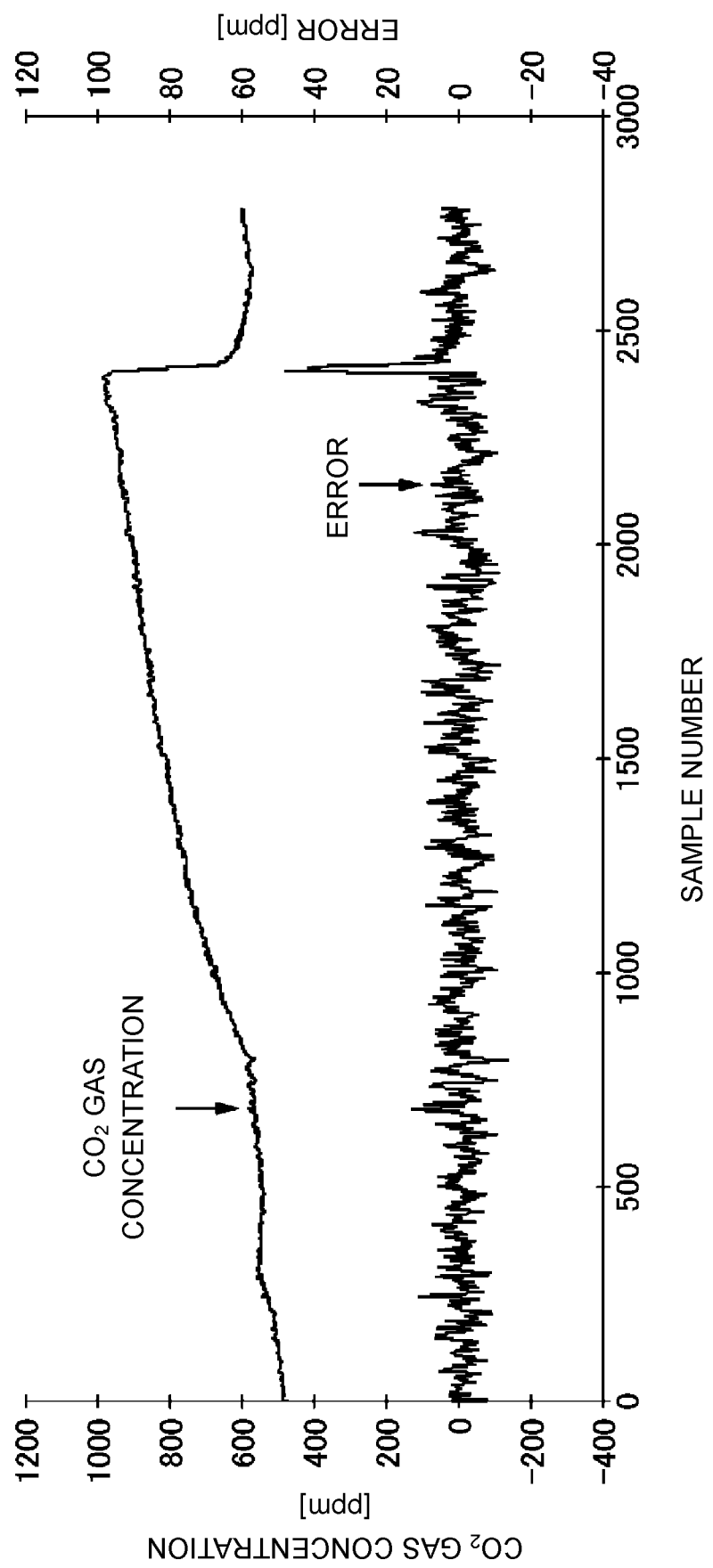
FIG. 15 is a diagram illustrating a result of simulation to which a process illustrated in FIG. 14 has been applied.

FIG. 15 illustrates a result of a simulation in which the process according to the example has been applied. The simulation result of this example is obtained by executing the process illustrated in FIG. 14. Further, an error for the output signal true value model of the $CO_2$ gas concentration change illustrated in FIG. 12 is indicated together. The horizontal axis indicates a sample number, and the left vertical indicates the $CO_2$ gas concentration in units of ppm obtained by the simulation. Further, the right vertical axis indicates an error in units of ppm.

Figure 16:
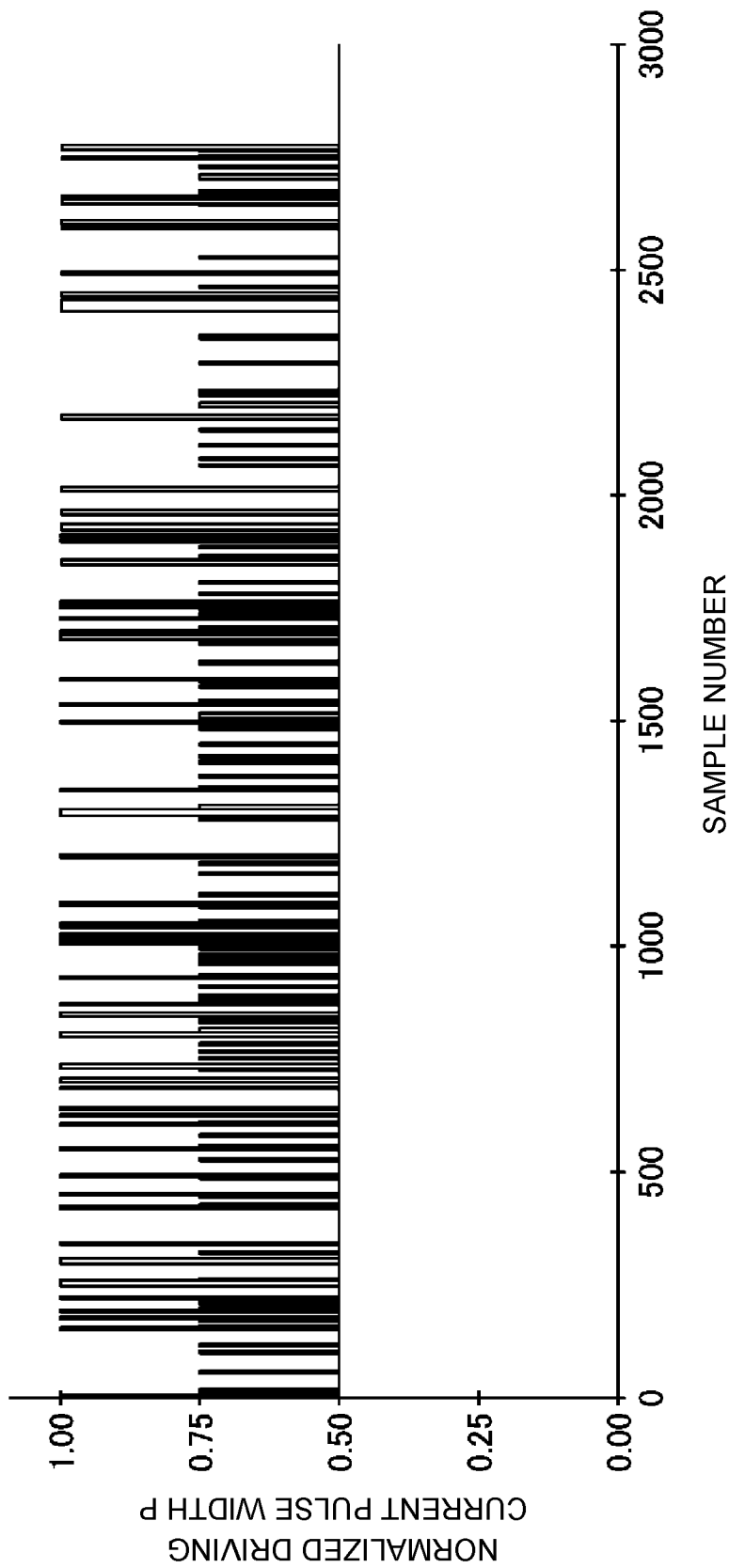
FIG. 16 is a diagram illustrating a change in a normalized driving current pulse width P obtained together with FIG. 15.

FIG. 16 illustrates a change in the normalized driving current pulse width P obtained together with FIG. 15. The horizontal axis indicates a sample number and the vertical axis indicates the normalized driving current pulse width P. The vertical axis of this example indicates the normalized driving current pulse width P in each measurement determined through the process illustrated in FIG. 14. Referring to FIG. 16, it can be seen that 0.75 or 0.50 is frequently used as the normalized driving current pulse width P, and current consumption is reduced. An average value of the normalized driving current pulse width P in a range illustrated in FIG. 16 was 0.54. Accordingly, it can be seen that 40% or more of the power consumed by the light source 101 is reduced on average by the disclosure.

Figure 17:
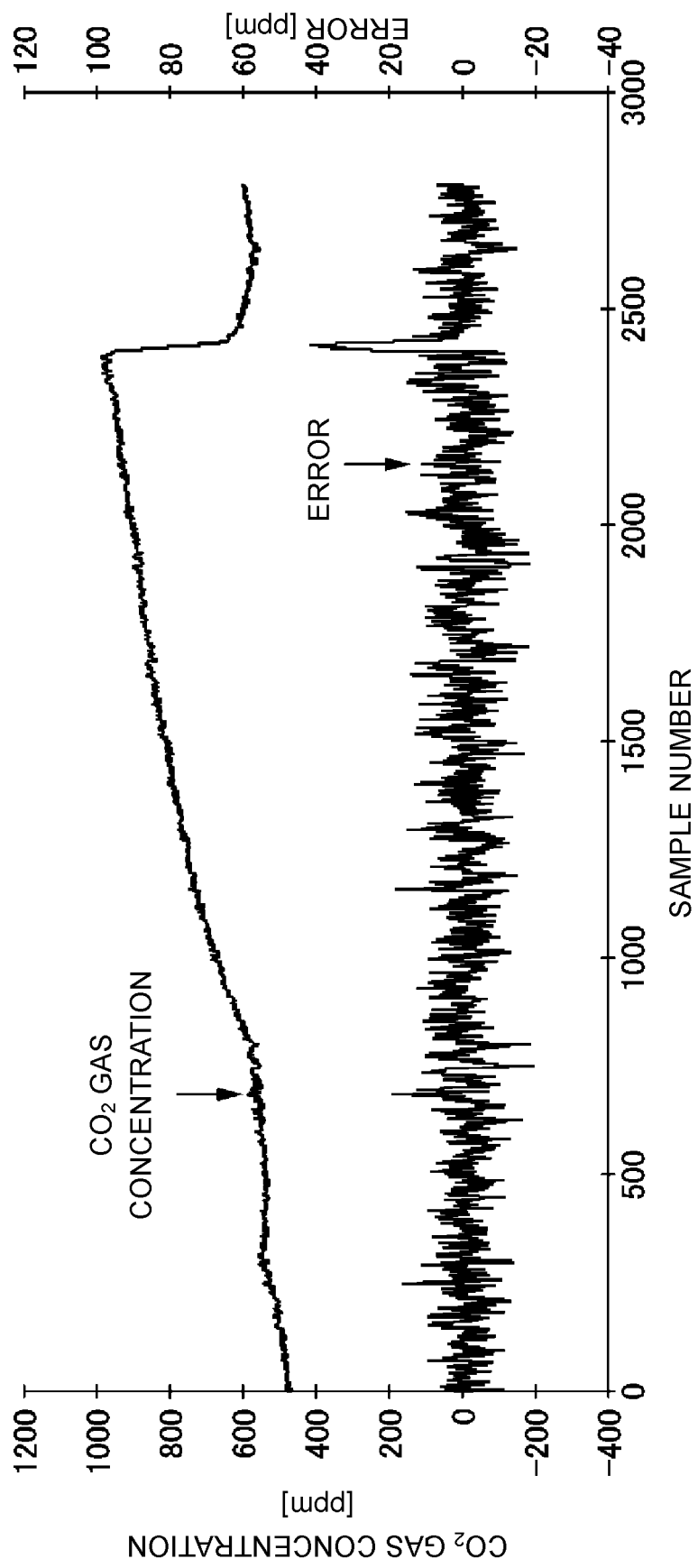
FIG. 17 is a diagram illustrating a comparative example when the normalized driving current pulse width P is constant.

FIG. 17 illustrates a comparative simulation result example when the normalized driving current pulse width P has been constant. In FIG. 17, the normalized driving current pulse width P is always kept constant with an average value of 0.54 which is equals to the average value the optical concentration measuring device 100 has described above for comparison. The horizontal axis indicates a sample number and the left vertical axis indicates the simulation result in units of ppm. Further, the right vertical axis indicates an error in units of ppm. In FIG. 17, it can be seen that an error due to noise increases as compared with that in FIG. 15.

For example, for 1000 points from sample number 1000 to sample number 1999, a root mean square of the error in FIG. 15, which is a result of using the optical concentration measuring device 100, was 4.3. On the other hand, a root mean square of the error in FIG. 17, which is a result of setting the normalized driving current pulse width P to a fixed value of 0.54, was 5.9.

The root mean square of the error in FIG. 15, which is a result of using the optical concentration measuring device 100, was 5.3 in the illustrated entire area. On the other hand, the root mean square of the error in FIG. 17, which is a result of setting the normalized driving current pulse width P to a fixed value of 0.54, was 6.3.

Figure 18:
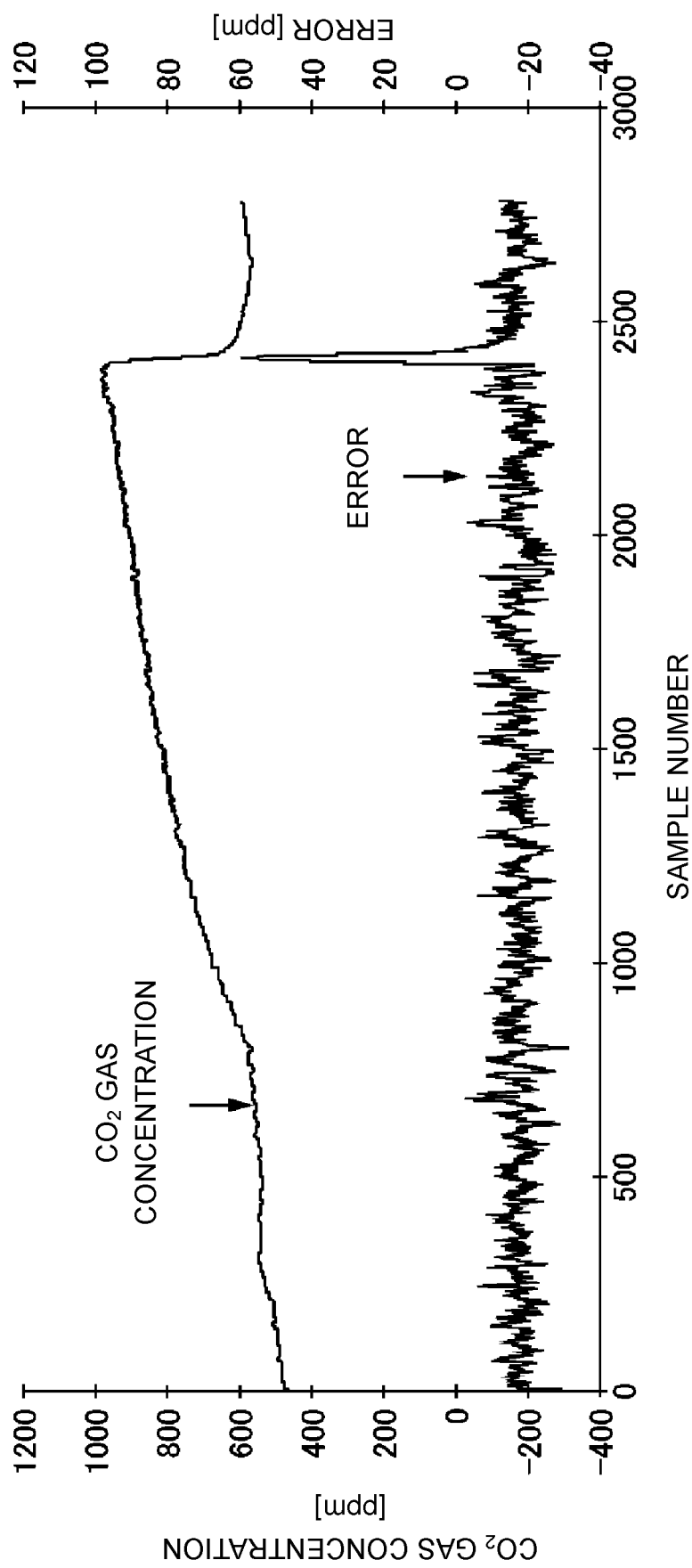
FIG. 18 is a diagram illustrating a comparative example when the normalized driving current pulse width P is constant and the α value is adjusted.

FIG. 18 illustrates a comparative simulation result example when the normalized driving current pulse width P is constant and the α value is adjusted. FIG. 18 shows a result of simulation when the normalized driving current pulse width P is always kept constant with an average value of 0.54 which is equals to the average value the optical concentration measuring device 100 has described above, and the α value has been adjusted for compensation for a resultant decreased SNR. The horizontal axis indicates a sample number and the left vertical axis indicates the simulation result in units of ppm. Further, the right vertical axis indicates an error in units of ppm. In FIG. 18, a response to a sudden change in the $CO_2$ gas concentration near the sample number 2400 is slow, and a large amount of error is generated accordingly, as compared with FIG. 15. The root mean square of the error illustrated in FIG. 18 was 4.3 for 1000 points from sample number 1000 to sample number 1999 and was 7.0 for the illustrated entire area.

As described above, referring to the result of the simulation, the optical concentration measuring device 100 can improve the power saving performance of the light source 101 and extend the lifespan of the light source 101 while suppressing degradation of the measurement accuracy and degradation of the responsiveness.

Although the disclosure has been described with reference to the embodiments, a technical scope of the disclosure is not limited to the scope described in the above embodiment. It will be apparent to those skilled in the art that various modifications or improvements can be added to the above embodiments. It is obvious from the description of the claims that aspects in which various modifications or improvements have been added can be included in the technical scope of the disclosure.

It should be noted that an order of execution of respective processes such as operations, procedures, steps, and stages in the device, system, program, and method shown in the claims, specification, and drawings can be realized as an arbitrary order as long as the order is not explicitly described as "before", "prior to", or the like and an output of a previous process is not used in a subsequent process. Even when an operation flow in the claims, the description, and the drawings is described using "first," "next," or the like for convenience, this does not mean that it is essential to perform the operation flow in this order.

What is claimed is:

1. An optical concentration measuring device, comprising:
   a light source, emitting an amount of light corresponding to a power to be supplied;
   a light sensor, receiving at least a part of the light emitted by the light source and generating a first signal corresponding to an amount of received light as an output signal;
   a smoothing filter, smoothing a second signal based on the output signal; and
   a controller, having a processor configured to:
      calculate a first change amount and a second change amount corresponding to a change amount between at least two selected acquisition values selected from acquisition values based on the output signal at a current or a past time;
      control the power supplied to the light source based on the first change amount; and
      control characteristics of the smoothing filter based on the second change amount.

2. The optical concentration measuring device according to claim 1, the controller being further configured to
   calculate a concentration value of measurement target molecules based on at least one of the output signal and the second signal based on the output signal smoothed by the smoothing filter.

3. The optical concentration measuring device according to claim 2, wherein the acquisition value is the concentration value.

4. The optical concentration measuring device according to claim 2, wherein the signal based on the output signal that is smoothed by the smoothing filter is the concentration value.

5. The optical concentration measuring device according to claim 1, wherein at least one of the selected acquisition values is a third signal smoothed by the smoothing filter.

6. The optical concentration measuring device according to claim 1, wherein, when the first change amount is smaller than a first reference value and the second change amount is smaller than a second reference value, the light source control part decreases the power supplied to the light source, and the controller is configured to increase a degree of smoothing of the smoothing filter.

7. The optical concentration measuring device according to claim 1, wherein, when the first change amount is larger than a third reference value and the second change amount is larger than a fourth reference value, the light source control part increases the power supplied to the light source, and the controller is configured to decrease a degree of smoothing of the smoothing filter.

8. The optical concentration measuring device according to claim 1, wherein the first change amount and the second change amount are the same.

9. The optical concentration measuring device according to claim 1,
wherein a waveform of the power supplied to the light source is a pulse shape, and
the controller is configured to control the power supplied to the light source by controlling a pulse width of the waveform of the power.

10. The optical concentration measuring device according to claim 1,
wherein a waveform of the power supplied to the light source is a pulse shape, and
the controller is configured to control the power supplied to the light source by controlling a pulse height of the waveform of the power.

11. The optical concentration measuring device according to claim 1,
wherein the smoothing filter includes an infinite impulse response filter, and
the controller is configured to control the characteristics of the smoothing filter by controlling a time constant of the infinite impulse response filter.

12. The optical concentration measuring device according to claim 1,
wherein the smoothing filter includes a moving average filter, and
the controller is configured to control the characteristics of the smoothing filter by controlling at least one of a number of points to be averaged and a weighting of the moving average filter.

13. A control method for an optical concentration measuring device, comprising:
emitting, by a light source, an amount of light corresponding to a power to be supplied;
receiving, by a light sensor at least a part of the light emitted by the light source and generating a signal corresponding to an amount of received light as an output signal;
smoothing, by a smoothing filter, a signal based on the output signal to generate a smoothed output signal;
calculating a first change amount and a second change amount corresponding to a change amount between at least two selected acquisition values selected from acquisition values based on the output signal at a current or a past time;
controlling the power, supplied to the light source, based on the first change amount; and
controlling characteristics of the smoothing filter based on the second change amount.

14. The method according to claim 13, further comprising:
calculating a concentration value of measurement target molecules based on at least one of the output signals and the smoothed output signal to generate a smoothed signal.

15. The method according to claim 14, wherein the acquisition value is the concentration value.

16. The method according to claim 14, wherein the smoothed signal is the concentration value.

17. The method according to claim 13, wherein at least one of the selected acquisition values is the smoothed output signal smoothed by the smoothing filter.

18. The method according to claim 13, wherein, when the first change amount is smaller than a first reference value and the second change amount is smaller than a second reference value, the power supplied to the light source is decreased, and a degree of smoothing of the smoothing filter is increased.

19. The method according to claim 13, wherein, when the first change amount is larger than a third reference value and the second change amount is larger than a fourth reference value, the power supplied to the light source is increased, and a degree of smoothing of the smoothing filter is decreased.

20. The method according to claim 13, wherein the first change amount and the second change amount are the same.

* * * * *